United States Patent
Xu et al.

(10) Patent No.: US 9,921,962 B2
(45) Date of Patent: Mar. 20, 2018

(54) MAINTAINING CACHE COHERENCY USING CONDITIONAL INTERVENTION AMONG MULTIPLE MASTER DEVICES

(71) Applicant: QUALCOMM Incorporated, San Diego, CA (US)

(72) Inventors: Kun Xu, Austin, TX (US); Thuong Quang Truong, Austin, TX (US); Jaya Prakash Subramaniam Ganasan, Youngsville, NC (US); Hien Minh Le, Cedar Park, TX (US); Cesar Aaron Ramirez, Hutto, TX (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 14/863,535

(22) Filed: Sep. 24, 2015

(65) Prior Publication Data
US 2017/0091095 A1    Mar. 30, 2017

(51) Int. Cl.
*G06F 12/00* (2006.01)
*G06F 13/00* (2006.01)
(Continued)

(52) U.S. Cl.
CPC ...... *G06F 12/0815* (2013.01); *G06F 12/0831* (2013.01); *G06F 2212/1024* (2013.01);
(Continued)

(58) Field of Classification Search
CPC ..... G06F 9/30; G06F 9/38; G06F 9/46; G06F 9/52; G06F 12/08; G06F 12/0802;
(Continued)

(56) References Cited

U.S. PATENT DOCUMENTS 5,751,995 A * 5/1998 Sarangdhar ........... G06F 9/3834
711/123
5,897,656 A * 4/1999 Vogt .................... G06F 12/0833
711/141
(Continued)

OTHER PUBLICATIONS

Blue Gene/L compute chip: Memory and Ethernet subsystem; Ohmacht et al; IBM Journal of Research and Development, vol. 49, iss. 2.3; Mar. 2005; pp. 255-264 (Year: 2005).*
(Continued)

*Primary Examiner* — Daniel C Chappell
(74) *Attorney, Agent, or Firm* — W&T/Qualcomm

(57) ABSTRACT

Maintaining cache coherency using conditional intervention among multiple master devices is disclosed. In one aspect, a conditional intervention circuit is configured to receive intervention responses from multiple snooping master devices. To select a snooping master device to provide intervention data, the conditional intervention circuit determines how many snooping master devices have a cache line granule size the same as or larger than a requesting master device. If one snooping master device has a same or larger cache line granule size, that snooping master device is selected. If more than one snooping master device has a same or larger cache line granule size, a snooping master device is selected based on an alternate criteria. The intervention responses provided by the unselected snooping master devices are canceled by the conditional intervention circuit, and intervention data from the selected snooping master device is provided to the requesting master device.

32 Claims, 17 Drawing Sheets

(51) Int. Cl.
*G06F 13/28* (2006.01)
*G06F 12/0815* (2016.01)
*G06F 12/0831* (2016.01)

(52) U.S. Cl.
CPC ............... *G06F 2212/1028* (2013.01); *G06F 2212/621* (2013.01); *Y02B 60/1225* (2013.01)

(58) Field of Classification Search
CPC .......... G06F 12/0804; G06F 12/0806; G06F 12/0808; G06F 12/0811; G06F 12/0813; G06F 12/0815; G06F 12/0817; G06F 12/082; G06F 12/0822; G06F 12/0824; G06F 12/0826; G06F 12/0828; G06F 12/0831; G06F 12/0833; G06F 12/0835; G06F 21/0837; G06F 2212/00–2212/7211; G06F 2212/621
See application file for complete search history.

(56) References Cited

U.S. PATENT DOCUMENTS

| | | | | |
|---|---|---|---|---|
| 6,115,795 A * | 9/2000 | Gilda | ............... | G06F 12/0811 711/118 |
| 6,141,733 A * | 10/2000 | Arimilli | ............ | G06F 12/0815 711/119 |
| 6,272,601 B1 * | 8/2001 | Nunez | ............... | G06F 12/0811 711/133 |
| 6,341,336 B1 * | 1/2002 | Arimilli | ............ | G06F 12/0833 711/122 |
| 6,505,283 B1 * | 1/2003 | Stoney | ............... | G06F 12/023 711/170 |
| 6,701,416 B1 * | 3/2004 | Arimilli | ............ | G06F 12/0811 711/141 |
| 6,807,608 B2 | 10/2004 | Augsburg et al. | | |
| 7,085,898 B2 * | 8/2006 | Blake | ............... | G06F 12/0813 370/460 |
| 7,181,572 B2 | 2/2007 | Walmsley | | |
| 7,305,522 B2 | 12/2007 | Clark et al. | | |
| 8,250,308 B2 * | 8/2012 | Papazova | ............ | G06F 12/0831 711/141 |
| 8,347,037 B2 | 1/2013 | Guthrie et al. | | |
| 2002/0087809 A1 * | 7/2002 | Arimilli | ............ | G06F 12/0831 711/144 |
| 2005/0240735 A1 * | 10/2005 | Shen | ............... | G06F 12/0831 711/144 |
| 2008/0320232 A1 * | 12/2008 | Vishin | ............... | G06F 12/0806 711/143 |
| 2009/0138220 A1 * | 5/2009 | Bell, Jr. | ............ | G06F 12/0817 702/60 |
| 2009/0138660 A1 * | 5/2009 | Bell, Jr. | ............ | G06F 12/0831 711/130 |
| 2010/0185816 A1 * | 7/2010 | Sauber | ............... | G06F 12/0886 711/122 |
| 2011/0320718 A1 * | 12/2011 | Szakacsits | ............ | G06F 12/0888 711/118 |
| 2013/0097385 A1 * | 4/2013 | Beckmann | ............ | G06F 12/084 711/128 |
| 2013/0318308 A1 * | 11/2013 | Jayasimha | ............ | G06F 12/0833 711/146 |
| 2015/0363317 A1 * | 12/2015 | Guthrie | ............... | G06F 12/0828 711/128 |

OTHER PUBLICATIONS

Stevens, Ashley, "Introduction to AMBA® 4 ACE™ and big.LITTLE™ Processing Technology" ARM White Paper, CoreLink Intelligent System IP by ARM, Jun. 6, 2011, Updated Jul. 29, 2013, 15 pages.
International Search Report and Written Opinion for PCT/US2016/050987, dated Nov. 7, 2016, 12 pages.
International Preliminary Report on Patentability for PCT/US2016/050987, dated Aug. 23, 2017, 22 pages.

\* cited by examiner

US 9,921,962 B2

MAINTAINING CACHE COHERENCY USING CONDITIONAL INTERVENTION AMONG MULTIPLE MASTER DEVICES

BACKGROUND

I. Field of the Disclosure

The technology of the disclosure relates generally to snoop-based cache coherency in processor-based systems, and in particular, to maintaining cache coherency in the presence of multiple master devices.

II. Background

Modern processor-based systems may include multiple interconnected master devices (e.g., central processing units (CPUs), graphics processing units (GPUs), processor clusters, and/or hardware accelerators, as non-limiting examples), each of which may access shared data and maintain its own cache of the shared data. To ensure that the cache of each master device within a processor-based system contains the most up-to-date version of the shared data, the master devices may implement bus coherency protocols for maintaining cache coherency among the caches. One class of bus coherency protocols is based on a mechanism known as "snooping." Using snooping, each master device monitors a bus to detect all read and write requests that originate from other master devices and that involve data that is shared among the master devices. If a master device detects (or "snoops") a read request for which it has the most up-to-date data, the master device may provide the requested data to a requesting master device (a process referred to as "intervening"). If the master device snoops a write transaction on the bus, the master device may invalidate its local copy of the written data within its cache. In this manner, a consistent view of the shared data may be provided to all of the master devices within the processor-based system.

Under some circumstances, multiple snooping master devices may provide intervention responses to a read request, even though ultimately only one snooping master device can provide intervention data in response to the read request. As a result, it may be necessary to select an appropriate snooping master device to provide intervention data from among the multiple snooping master devices. However, this task may be complicated in processor-based systems in which master devices use caches based on different cache line granule sizes, and/or use different bus coherency protocols that allow intervention under different circumstances (e.g., intervention on a SharedClean cache state). Thus, it is desirable to provide a mechanism for conditionally selecting a master device from among multiple snooping master devices to maintain cache coherency, to provide shorter intervention latency, and to reduce processor power consumption.

SUMMARY OF THE DISCLOSURE

Aspects disclosed in the detailed description include maintaining cache coherency using conditional intervention among multiple master devices. In this regard, a conditional intervention circuit in a processor-based system is provided. The conditional intervention circuit is communicatively coupled to multiple master devices (such as central processing units (CPUs), graphics processing units (GPUs), processor clusters, and/or hardware accelerators, as non-limiting examples) according to one or more snoop-based cache coherency protocols via a bus. Each of the master devices includes a cache, and thus is associated with a cache line granule size of the cache. The conditional intervention circuit includes a snoop request management circuit and is configured to receive intervention responses (e.g., in response to a snooped read request) from multiple snooping master devices. To select a snooping master device to provide intervention data, the conditional intervention circuit first determines how many of the snooping master devices have a cache line granule size that is the same as or larger than a cache line granule size of a requesting master device. If only one snooping master device has a cache line granule size that is the same as or larger than the cache line granule size of the requesting master device, that snooping master device is selected to provide intervention data. If more than one snooping master device has cache line granule sizes that are the same as or larger than the cache line granule size of the requesting master device, a snooping master device is selected from among the more than one snooping master device using an alternate selection criteria. As non-limiting examples, the alternate selection criteria may include selecting a snooping master device having a shortest path to the requesting master device or a cache line granule size closest to the cache line granule size of the requesting master device. In some aspects, if no snooping master device has the same or larger cache line granule size as the requesting master device, a snooping master device may be selected based on the alternate selection criteria. If the selected snooping master device is unable to provide all intervention data, the conditional intervention circuit may retrieve missing data from a system memory. The intervention responses provided by the unselected snooping master devices are then canceled by the snoop management request circuit of the conditional intervention circuit, and intervention data from the selected snooping master device is provided to the requesting master device.

In another aspect, a conditional intervention circuit for maintaining cache coherency using conditional intervention is provided. The conditional intervention circuit comprises a snoop request management circuit. The conditional intervention circuit is configured to receive, using the snoop request management circuit, a plurality of intervention responses from a corresponding plurality of snooping master devices of a plurality of master devices according to one or more snoop-based cache coherency protocols, each master device of the plurality of master devices associated with a cache line granule size of a cache of the master device. The conditional intervention circuit is further configured to determine a count of the plurality of snooping master devices having a same or larger cache line granule size as a requesting master device of the plurality of master devices. The conditional intervention circuit is also configured to, responsive to determining that one snooping master device has the same or larger cache line granule size, select the one snooping master device having the same or larger cache line granule size. The conditional intervention circuit is additionally configured to, responsive to determining that more than one snooping master device of the plurality of snooping master devices has the same or larger cache line granule size, select a snooping master device based on an alternate selection criteria from among the more than one snooping master device having the same or larger cache line granule size. The conditional intervention circuit is further configured to cancel, using the snoop request management circuit, one or more intervention responses of the plurality of intervention responses from a corresponding one or more unselected snooping master devices of the plurality of snooping master devices. The conditional intervention circuit is also configured to provide, using the snoop request management circuit, intervention data from the selected snooping master device to the requesting master device.

In another aspect, a conditional intervention circuit for maintaining cache coherency using conditional intervention is provided. The conditional intervention circuit comprises a means for receiving a plurality of intervention responses from a corresponding plurality of snooping master devices of a plurality of master devices according to one more snoop-based cache coherency protocols, each master device associated with a cache line granule size of a cache of the master device. The conditional intervention circuit further comprises a means for determining a count of the plurality of snooping master devices having a same or larger cache line granule size as a requesting master device of the plurality of master devices. The conditional intervention circuit also comprises a means for selecting, responsive to determining that one snooping master device has the same or larger cache line granule size, the one snooping master device of the plurality of snooping master devices having the same or larger cache line granule size. The conditional intervention circuit additionally comprises a means for selecting, responsive to determining that more than one snooping master device of the plurality of snooping master devices has the same or larger cache line granule size, a snooping master device based on an alternate selection criteria from among the more than one snooping master device of the plurality of snooping master devices having the same or larger cache line granule size. The conditional intervention circuit further comprises a means for canceling one or more intervention responses of the plurality of intervention responses from a corresponding one or more unselected snooping master devices of the plurality of snooping master devices. The conditional intervention circuit also comprises a means for providing intervention data from the selected snooping master device to the requesting master device.

In another aspect, a method of maintaining cache coherency using conditional intervention is provided. The method comprises receiving, by a conditional intervention circuit, a plurality of intervention responses from a corresponding plurality of snooping master devices of a plurality of master devices according to one or more snoop-based cache coherency protocols, each master device of the plurality of master devices associated with a cache line granule size of a cache. The method further comprises determining a count of the plurality of snooping master devices having a same or larger cache line granule size as a requesting master device of the plurality of master devices. The method also comprises, responsive to determining that one snooping master device of the plurality of snooping master devices has the same or larger cache line granule size, selecting the one snooping master device having the same or larger cache line granule size. The method additionally comprises, responsive to determining that more than one snooping master device of the plurality of snooping master devices has the same or larger cache line granule size, selecting a snooping master device based on an alternate selection criteria from among the more than one snooping master device having the same or larger cache line granule size. The method further comprises canceling one or more intervention responses of the plurality of intervention responses from a corresponding one or more unselected snooping master devices of the plurality of snooping master devices. The method also comprises providing intervention data from the selected snooping master device to the requesting master device.

DETAILED DESCRIPTION

Figure 1:
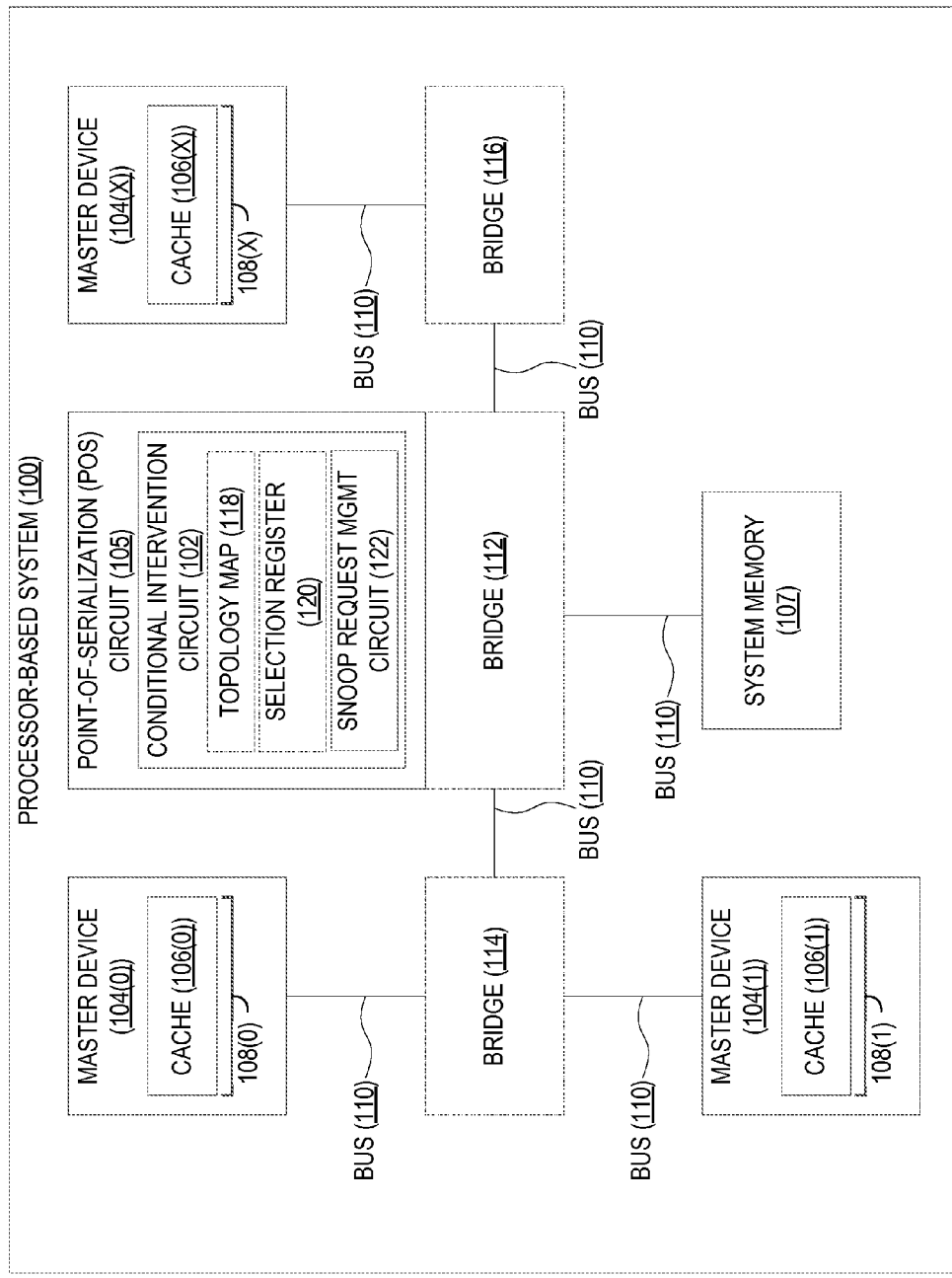
FIG. 1 is a block diagram of an exemplary processor-based system providing a conditional intervention circuit for maintaining cache coherency using conditional intervention among multiple master devices.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include maintaining cache coherency using conditional intervention among multiple master devices. In this regard, FIG. 1 illustrates an exemplary processor-based system 100 providing a conditional intervention circuit 102 for maintaining cache coherency among a plurality of master devices 104(0)-104(X) using conditional intervention. In the example of FIG. 1, the conditional intervention circuit 102 is located as part of a point-of-serialization circuit 105. However, it is to be understood that the conditional intervention circuit 102 in some aspects may be positioned anywhere within the processor-based system 100 from which the conditional intervention circuit 102 can monitor communications among the master devices 104(0)-104(X). In some aspects, the plurality of master devices 104(0)-104(X) of the processor-based system 100 may comprise heterogeneous devices such as central processing units (CPUs), graphics processing units (GPUs), processor clusters, and/or hardware accelerators, as non-limiting examples. The processor-based system 100 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that, in some aspects, the processor-based system 100 may contain more or fewer master devices 104(0)-104(X) than illustrated in FIG. 1.

The master devices 104(0)-104(X) of the processor-based system 100 include corresponding caches 106(0)-106(X), which enable shared data (not shown) to be stored locally for quicker access by the master devices 104(0)-104(X). This may allow the master devices 104(0)-104(X) to minimize the need for relatively slower accesses to a system memory 107, thereby improving performance and reducing power consumption of the processor-based system 100. The caches 106(0)-106(X) are each characterized by a cache line granule size 108(0)-108(X). The cache line granule sizes 108(0)-108(X) of the caches 106(0)-106(X) represent fixed block sizes in which data may be transferred into and out of the caches 106(0)-106(X). In some aspects, the cache line granule sizes 108(0)-108(X) may comprise different sizes (e.g., 64 bytes and 128 bytes, as non-limiting examples) within the same processor-based system 100.

The master devices 104(0)-104(X) of FIG. 1 are communicatively connected to each other and to the conditional intervention circuit 102 via a bus 110. In the example of FIG. 1, the master devices 104(0), 104(1) are connected to a bridge 112 of the conditional intervention circuit 102 via a bridge 114, while the master device 104(X) is connected to the bridge 112 via a bridge 116. In this manner, the conditional intervention circuit 102 is configured to enable each of the master devices 104(0)-104(X) to snoop read requests (not shown) sent by other master devices 104(0)-104(X), and to provide intervention responses (not shown). In some aspects, the interconnections between the master devices 104(0)-104(X) and the conditional intervention circuit 102 may vary from those illustrated in FIG. 1.

Each of the caches 106(0)-106(X) of FIG. 1 may store local copies of shared data, which can be read and/or modified by any of the master devices 104(0)-104(X). Thus, to ensure that the shared data stored in the caches 106(0)-106(X) is viewed in a consistent manner by the master devices 104(0)-104(X), each of the master devices 104(0)-104(X) implements one of one or more snoop-based bus coherency protocols. As a non-limiting example, the master devices 104(0)-104(X) may implement the Advanced Extensible Interface (AXI) Coherency Extensions (ACE) protocol. Some aspects may provide that the master devices 104(0)-104(X) may implement different bus coherency protocols within the same processor-based system 100.

The snoop-based bus coherency protocols implemented by the master devices 104(0)-104(X) enable each of the master devices 104(0)-104(X) to monitor the bus 110 to snoop read requests that originate from other master devices 104(0)-104(X) and that involve data that is shared among the master devices 104(0)-104(X). If one of the master devices 104(0)-104(X) (i.e., a "snooping master device 104(0)-104(X)") snoops a read request for which it has the most up-to-date data, the snooping master device 104(0)-104(X) may provide an intervention response (not shown) to the conditional intervention circuit 102, and may provide intervention data (not shown) comprising the up-to-date data to the master device 104(0)-104(X) that issued the read request (i.e., the "requesting master device 104(0)-104(X)"). However, under some circumstances, intervention responses may be provided by multiple snooping master devices 104(0)-104(X) in response to a read request, even though ultimately only one snooping master device 104(0)-104(X) can provide intervention data in response to the read request. As a result, it may be necessary to select an appropriate snooping master device 104(0)-104(X) to provide intervention data from among the multiple snooping master devices 104(0)-104(X). This task may be complicated if the master devices 104(0)-104(X) use caches 106(0)-106(X) that are have different cache line granule sizes 108(0)-108(X), and/or if the master devices 104(0)-104(X) use different bus coherency protocols that allow intervention under different circumstances.

In this regard, the conditional intervention circuit 102 is configured to enable conditional intervention among the multiple master devices 104(0)-104(X) seeking to supply intervention data for a snooped read request. The conditional intervention circuit 102 is configured to receive intervention responses (e.g., in response to a snooped read request) from multiple snooping master devices 104(0)-104(X). To select one of the snooping master devices 104(0)-104(X) to provide intervention data, the conditional intervention circuit 102 first determines how many of the snooping master devices 104(0)-104(X) have a cache line granule size 108(0)-108(X) that is the same as or larger than a cache line granule size 108(0)-108(X) of a requesting master device 104(0)-104(X). If only one snooping master device 104(0)-104(X) has a cache line granule size 108(0)-108(X) that is the same as or larger than a cache line granule size 108(0)-108(X) of the requesting master device 104(0)-104(X), the conditional intervention circuit 102 selects that snooping master device 104(0)-104(X) to provide intervention data. If more than one snooping master device 104(0)-104(X) has cache line granule sizes 108(0)-108(X) that are the same as or larger than the cache line granule size 108(0)-108(X) of the requesting master device 104(0)-104(X), the conditional intervention circuit 102 selects a snooping master device 104(0)-104(X) using an alternate selection criteria. As non-limiting examples, the alternate selection criteria may specify that a snooping master device 104(0)-104(X) having a shortest path to the requesting master device 104(0)-104(X), and/or a snooping master device 104(0)-104(X) having a closest cache line granule size 108(0)-108(X) to the cache line granule size 108(0)-108(X) of the requesting master device 104(0)-104(X) is selected. According to some aspects, selection of a snooping master device 104(0)-104(X) having a shortest path to the requesting master device 104(0)-104(X) may be carried out by the conditional intervention circuit 102 using a topology map 118 that is maintained by the conditional intervention circuit 102. The topology map 118 in some aspects may provide a representation of the interconnections between the master devices 104(0)-104(X), and may be used by the conditional intervention circuit 102 to determine and compare the length of paths between any two (2) of the master devices 104(0)-104(X). The alternate selection criteria in some aspects may be indicated by a selection register 120 of the conditional intervention circuit 102. The conditional intervention circuit 102 may further comprise a snoop request management circuit 122 for sending, receiving, and/or canceling snoop requests and/or intervention responses.

After selecting one of the snooping master devices 104(0)-104(X) to provide intervention data, the conditional intervention circuit 102 cancels the intervention responses provided by unselected snooping master devices 104(0)-104(X). In some aspects, canceling the intervention responses of the unselected snooping master devices 104(0)-104(X) may be accomplished by setting one or more cancellation vector bits (not shown) corresponding to the unselected snooping master devices 104(0)-104(X) within a cancellation vector (not shown). The cancellation vector may then be provided as part of a final result (not shown) that is transmitted to the master devices 104(0)-104(X). Intervention data from the selected snooping master device 104(0)-104(X) is then provided to the requesting master device 104(0)-104(X).

Some aspects may provide that one or more of the snooping master devices 104(0)-104(X) are configured to provide early intervention data transfer to the requesting master device 104(0)-104(X) (e.g., through the use of bus coherency protocols that enforce strict intervention policies). In such aspects, the one or more snooping master devices 104(0)-104(X) may send data before the final result is generated. To provide increased response time, the conditional intervention circuit 102 in such aspects may maintain the intervention responses from such snooping master devices 104(0)-104(X), rather than canceling the intervention responses.

In some instances, one or more of the master devices 104(0)-104(X) may provide a retry response (not shown) rather than an intervention response. For example, a retry response may be provided if the snooped read request presents a conflict with another pending request currently being processed by the master device 104(0)-104(X) (i.e., the "retry master device 104(0)-104(X)"). In some instances, the retry response may result from coherency requirements (e.g., a cache state is undetermined, or data is currently being cast out of the cache), or may occur due to structural reasons, such as a queue reaching capacity. In such instances, the retry master device 104(0)-104(X) may actually possess the most up-to-date shared data, but the retry response may hide the presence of the shared data from the conditional intervention circuit 102. Accordingly, in some aspects, upon receiving a retry response, the conditional intervention circuit 102 may cancel intervention responses from each snooping master device 104(0)-104(X) that has a cache line granule size 108(0)-108(X) that is smaller than a cache line granule size 108(0)-108(X) of the retry master device 104(0)-104(X).

This may ensure that the conditional intervention circuit 102 does not select a snooping master device 104(0)-104(X) that can provide only a subset of the intervention data required for the snooped read request.

To illustrate exemplary communications flows among the conditional intervention circuit 102 and the master devices 104(0)-104(X) of FIG. 1 for selecting a snooping master device 104(0)-104(X) based on a cache line granule size 108(0)-108(X), FIGS. 2A-2D are provided. In FIGS. 2A-2D, the processor-based system 100 of FIG. 1 is shown. The master devices 104(0) and 104(X) of FIGS. 2A-2D have cache line granule sizes 108(0) and 108(X), respectively, of 128 bytes ("128B"). The master device 104(1) of FIGS. 2A-2D has a cache line granule size 108(1) of 64 bytes ("64B"). For the sake of clarity, the bus 110 of FIG. 1 is not shown in FIGS. 2A-2D.

Figure 2A:
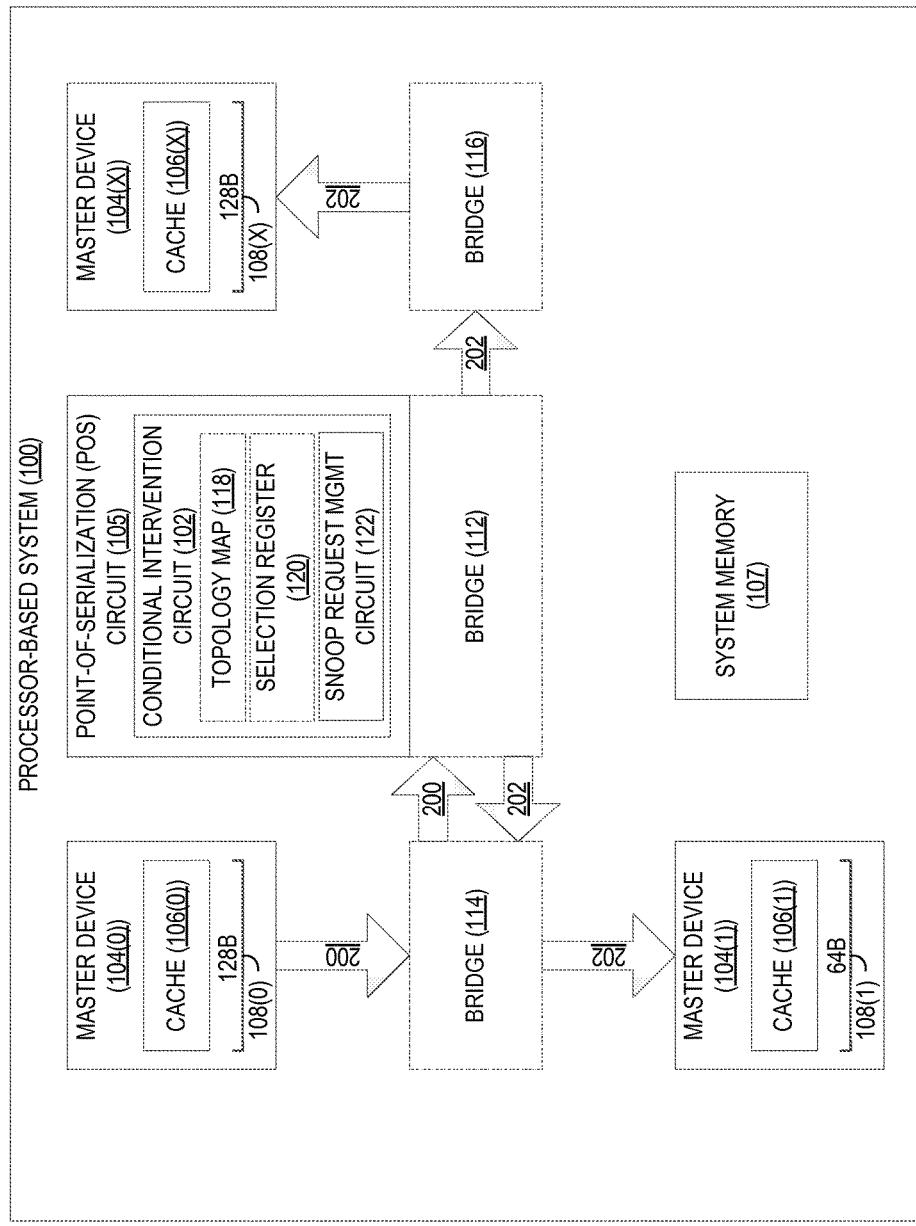
FIGS. 2A-2D are block diagrams illustrating exemplary communications flows among the conditional intervention circuit and master devices of FIG. 1 for selecting a snooping master device to provide intervention data based on a cache line granule size.

In FIG. 2A, the master device 104(0) (i.e., the "requesting master device 104(0)") sends a read request 200, representing a request to read shared data (not shown) that is accessible to all of the master devices 104(0)-104(X), and to the conditional intervention circuit 102 via the bridge 114 and the bridge 112. The conditional intervention circuit 102 sends a snoop response 202 to the master devices 104(1) and 104(X) (i.e., the "snooping master devices 104(1) and 104(X)"). The snoop response 202 enables the snooping master devices 104(1) and 104(X) to monitor the read request 200, and potentially to intervene with up-to-date shared data.

Figure 2B:
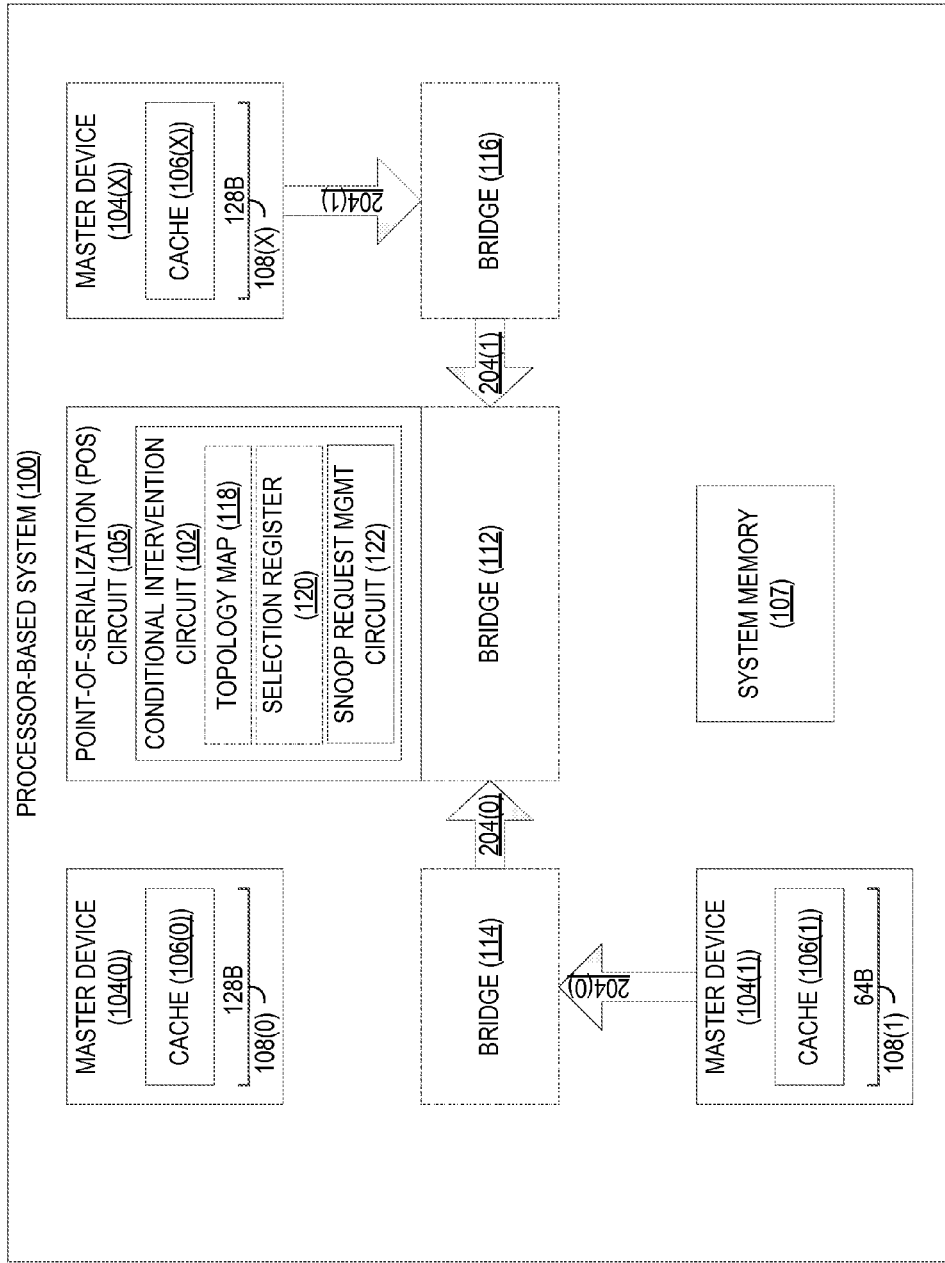

As seen in FIG. 2B, the conditional intervention circuit 102 then receives intervention responses 204(0) and 204(1) from the snooping master devices 104(1) and 104(X), respectively. The intervention responses 204(0) and 204(1) indicate to the conditional intervention circuit 102 that the snooping master devices 104(1) and 104(X) are candidates for providing intervention data to the requesting master device 104(0) in response to the read request 200. To select one of the snooping master devices 104(1) and 104(X) to provide intervention data, the conditional intervention circuit 102 determines how many of the snooping master devices 104(1), 104(X) have a cache line granule size 108(1), 108(X) that is the same as or greater than the cache line granule size 108(0) of the requesting master device 104(0). In this example, the cache line granule size 108(X) of the snooping master device 104(X) (i.e., 128 bytes) is the same as the cache line granule size 108(0) of the requesting master device 104(0), while the cache line granule size 108(1) of the snooping master device 104(1) (i.e., 64 bytes) is smaller than the cache line granule size 108(0) of the requesting master device 104(0). Thus, in this example, the conditional intervention circuit 102 selects the snooping master device 104(X) to provide intervention data to the requesting master device 104(0).

Figure 2C:
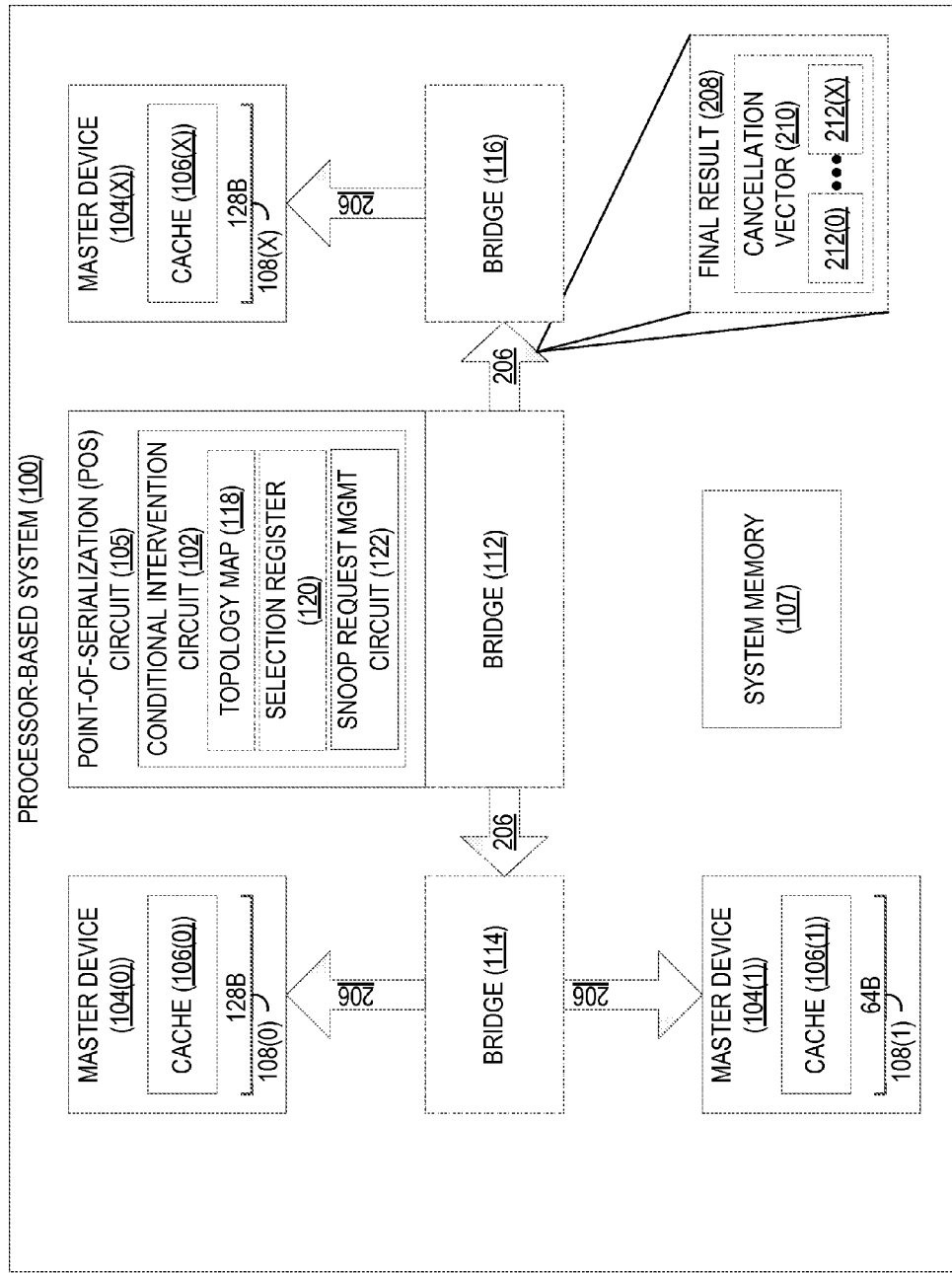

After selecting the snooping master device 104(X), the conditional intervention circuit 102 cancels the intervention response 204(0) from the unselected snooping master device 104(1). As shown in FIG. 2C, this is accomplished by the conditional intervention circuit 102 communicating data 206 indicating the selection of the snooping master device 104(X) and the cancellation of the intervention response 204(0) from the unselected snooping master device 104(1) to the each of the master devices 104(0)-104(X). In some aspects, the data 206 communicated to the master devices 104(0)-104(X) may comprise a final result 208 that includes a cancellation vector 210. The cancellation vector 210 is made up of a plurality of cancellation vector bits 212(0)-212(X) corresponding to the master devices 104(0)-104(X). By setting the cancellation vector bit 212(1) associated with the unselected snooping master device 104(1), the conditional intervention circuit 102 may indicate to the unselected snooping master device 104(1) that its intervention response 204(0) is canceled.

Figure 2D:
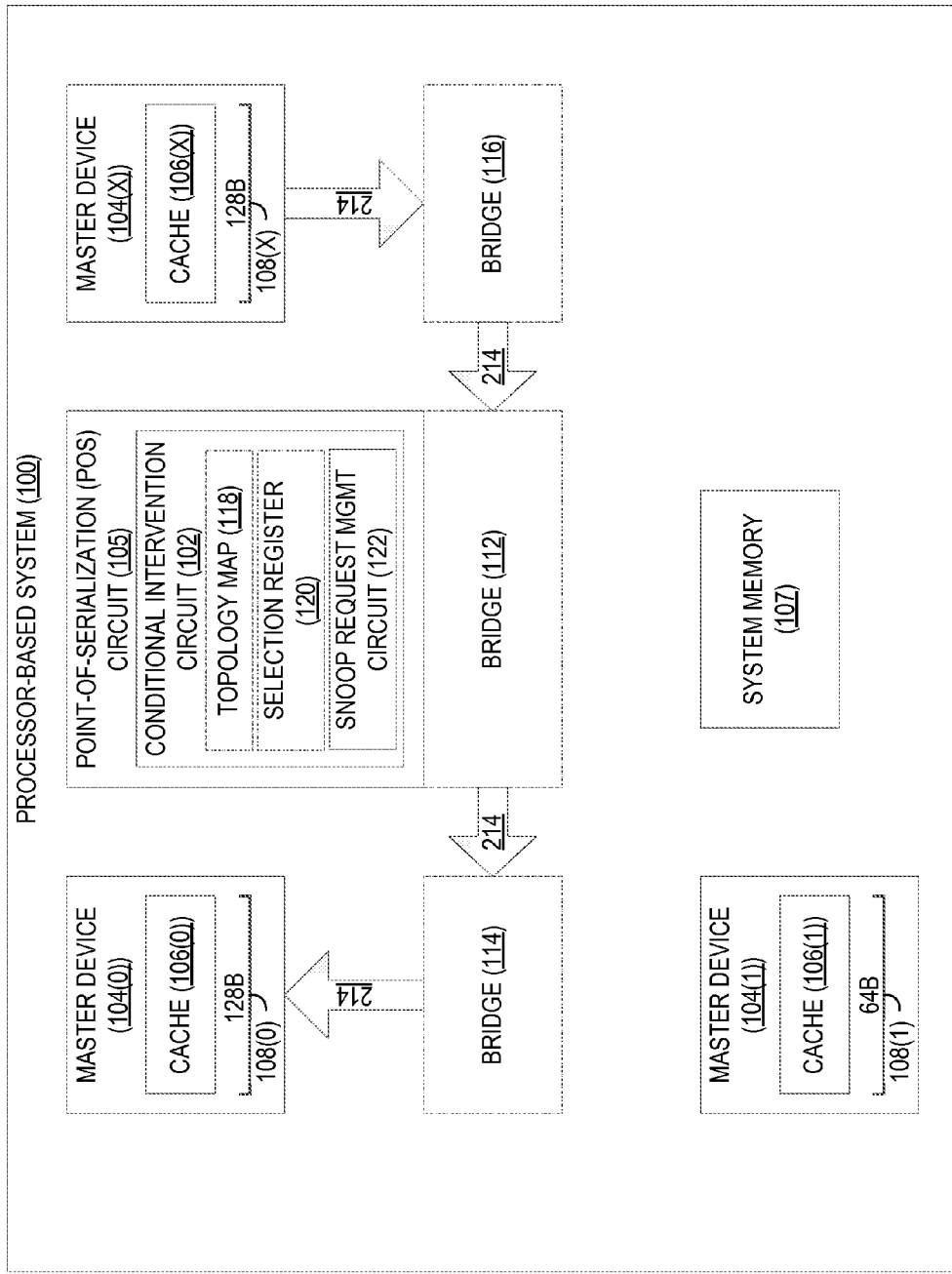

Finally, as seen in FIG. 2D, the conditional intervention circuit 102 provides intervention data 214 from the selected snooping master device 104(X) to the requesting master device 104(0). The intervention data 214 in some aspects represents an up-to-date copy of data requested by the read request 200 sent by the requesting master device 104(0). By selecting the snooping master device 104(X) having the cache line granule size 108(X) that is the same as or larger than the cache line granule size 108(0) of the requesting master device 104(0), the conditional intervention circuit 102 ensures that all shared data requested by the read request 200 is provided to the requesting master device 104(0).

FIGS. 3A-3D illustrate exemplary communications flows among the conditional intervention circuit 102 and the master devices 104(0)-104(X) of FIG. 1 for selecting a snooping master device 104(0)-104(X) to provide intervention data (not shown) further based on a shortest path to the requesting master device 104(0). In FIGS. 3A-3D, the processor-based system 100 of FIG. 1 is shown, with the master devices 104(0) and 104(1) of FIGS. 3A-3D having cache line granule sizes 108(0) and 108(1), respectively, of 64 bytes ("64B"). The master device 104(X) of FIGS. 3A-3D has a cache line granule size 108(X) of 128 bytes ("128B"). The bus 110 of FIG. 1 is omitted from FIGS. 3A-3D for the sake of clarity.

Figure 3A:
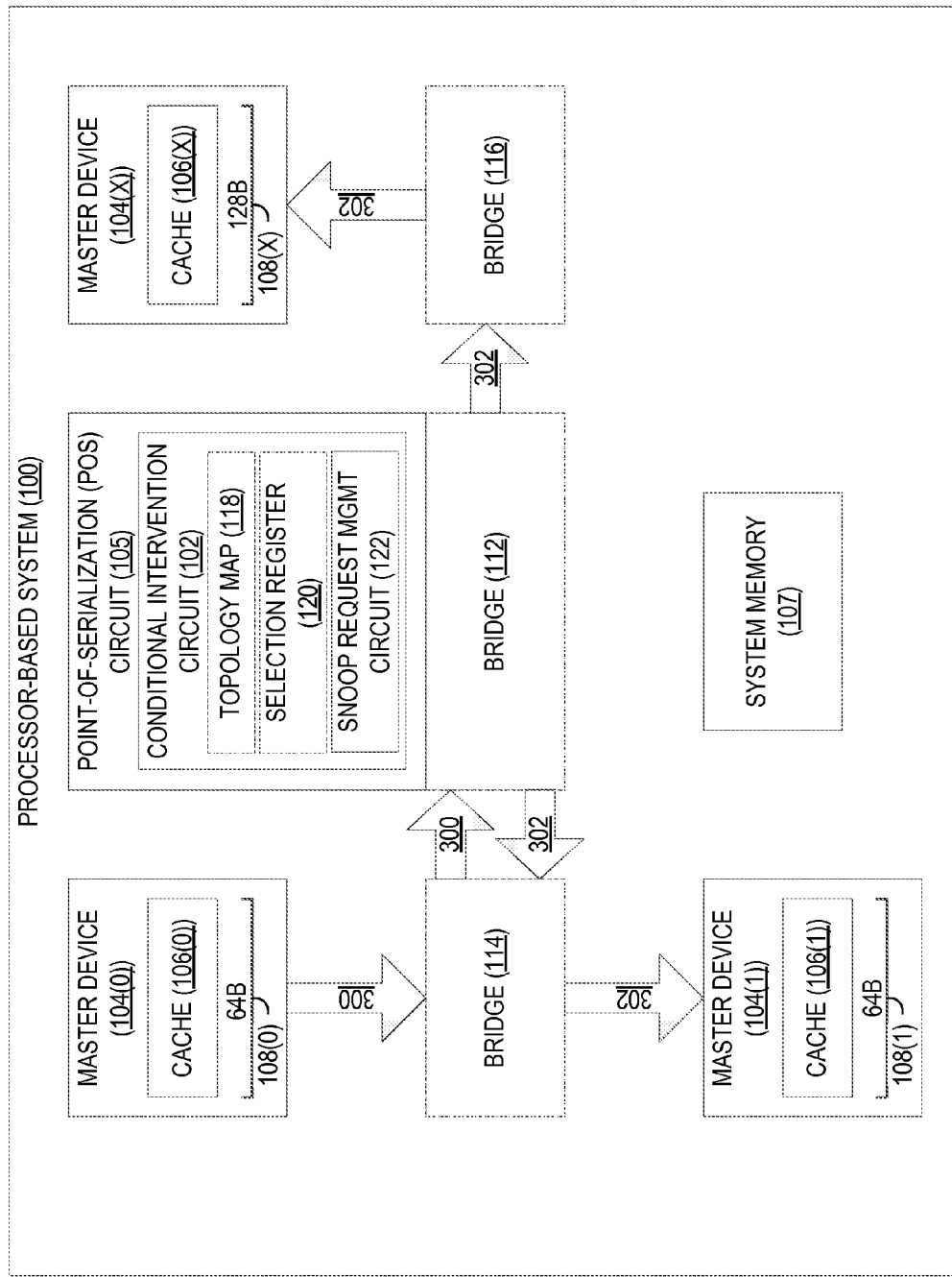
FIGS. 3A-3D are block diagrams illustrating exemplary communications flows among the conditional intervention circuit and master devices of FIG. 1 for selecting a snooping master device to provide intervention data based on a shortest path.

As seen in FIG. 3A, the requesting master device 104(0) sends a read request 300 to the conditional intervention circuit 102 via the bridge 114 and the bridge 112. In response, the conditional intervention circuit 102 sends a snoop response 302 to the snooping master devices 104(1) and 104(X). The conditional intervention circuit 102 then receives the intervention responses 204(0) and 204(1) in FIG. 3B from the snooping master devices 104(1) and 104(X), respectively, indicating to the conditional intervention circuit 102 that the snooping master devices 104(1) and 104(X) are candidates for providing intervention data to the requesting master device 104(0).

Figure 3B:
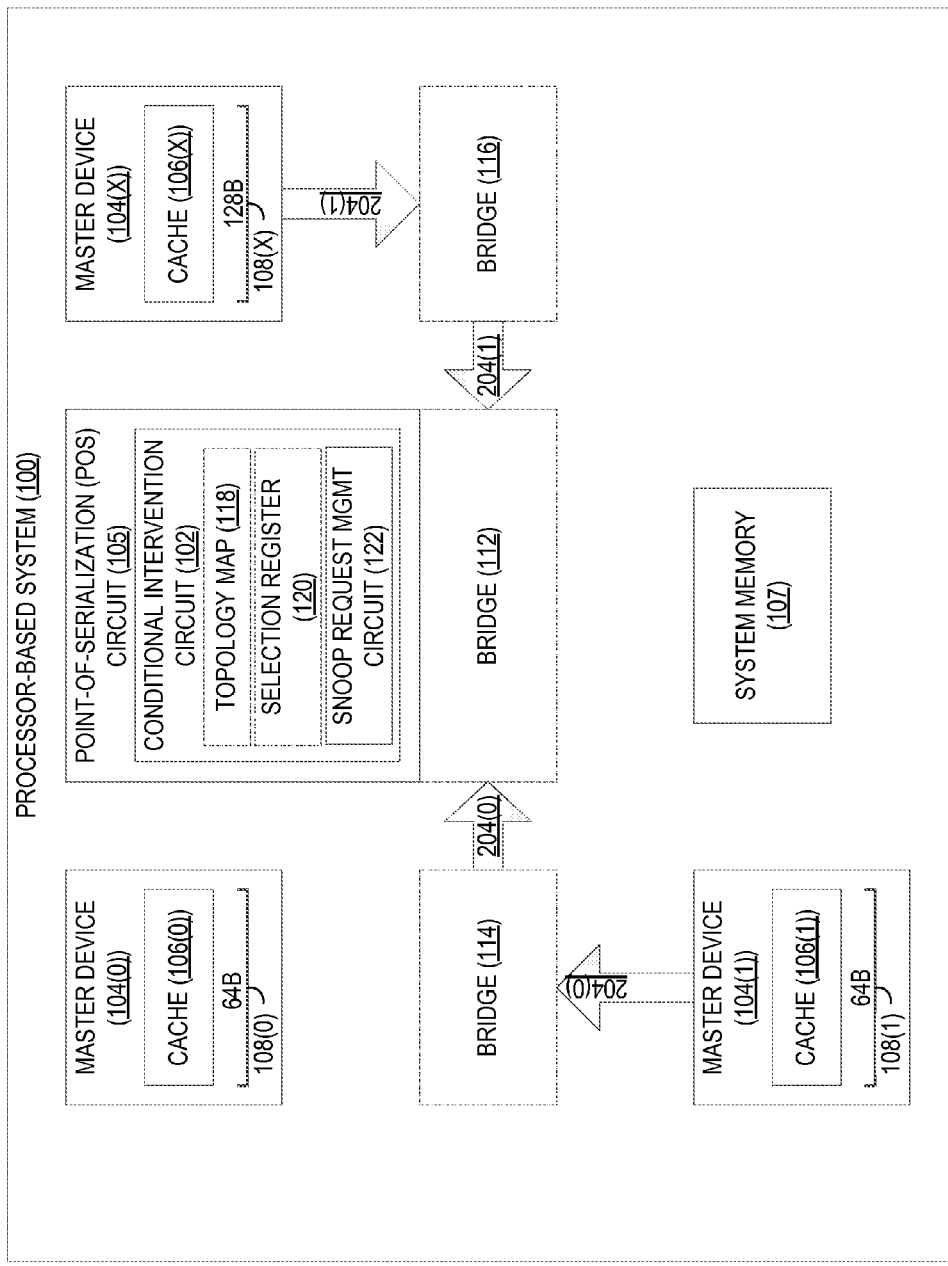

To select one of the snooping master devices 104(1) and 104(X) to provide intervention data, the conditional intervention circuit 102 determines how many of the snooping master devices 104(1), 104(X) have a cache line granule size 108(1), 108(X) that is the same as or greater than the cache line granule size 108(0) of the requesting master device 104(0). In the example of FIGS. 3A-3D, the cache line granule size 108(X) of the snooping master device 104(X) (i.e., 128B) is larger than the cache line granule size 108(0) of the requesting master device 104(0), while the cache line granule size 108(1) of the snooping master device 104(1) (i.e., 64B) is the same size as the cache line granule size 108(0) of the requesting master device 104(0). Because there are at least two snooping master devices 104(1), 104(X) having cache line granule sizes 108(1), 108(X) that are the same as or larger than the cache line granule size 108(0) of the requesting master device 104(0), additional operations are required to select one of the snooping master devices 104(1), 104(X) to provide intervention data. Accordingly, the conditional intervention circuit 102 selects one of the snooping master devices 104(1), 104(X) based on an alternate selection criteria indicated by the selection register 120. In this example, the conditional intervention circuit 102 selects one of the snooping master devices 104(1), 104(X) having a shortest path to the requesting master device 104(0). As seen in FIG. 3B, the snooping master device 104(1) has a shorter path to the requesting master device 104(0) than the snooping master device 104(X), which the conditional intervention circuit 102 may determine using the topology map 118. Thus, the conditional intervention circuit 102 selects the snooping master device 104(1) to provide intervention data to the requesting master device 104(0).

Note that in some aspects having different performance requirements, a different alternate selection criteria may be used by the conditional intervention circuit 102. For example, in some environments, throughput may be a more important consideration than response time. Accordingly, the conditional intervention circuit 102 may select a snooping master device 104(1), 104(X) having a closest cache line granule size 108(1), 108(X) to the cache line granule size 108(0) of the requesting master device 104(0) to maximize throughput. In the example of FIG. 3B, the snooping master device 104(1) has the same cache line granule size 108(1) as the cache line granule size 108(0) of the requesting master device 104(0), and thus the conditional intervention circuit 102 would select the snooping master device 104(1) under this alternate selection criteria as well.

Some aspects of the conditional intervention circuit 102 may also use the alternate selection criteria in circumstances in which neither of the snooping master devices 104(1), 104(X) are found have a cache line granule size 108(1), 108(X) that is the same or larger than the cache line granule size 108(0) of the requesting master device 104(0). In such circumstances, the conditional intervention circuit 102 may select one of the snooping master devices 104(1), 104(X) based on the alternate selection criteria as discussed above to provide at least partial data to the requesting master device 104(0). The conditional intervention circuit 102 would then retrieve any missing data from the system memory 107 and provide it to the requesting master device 104(0).

Figure 3C:
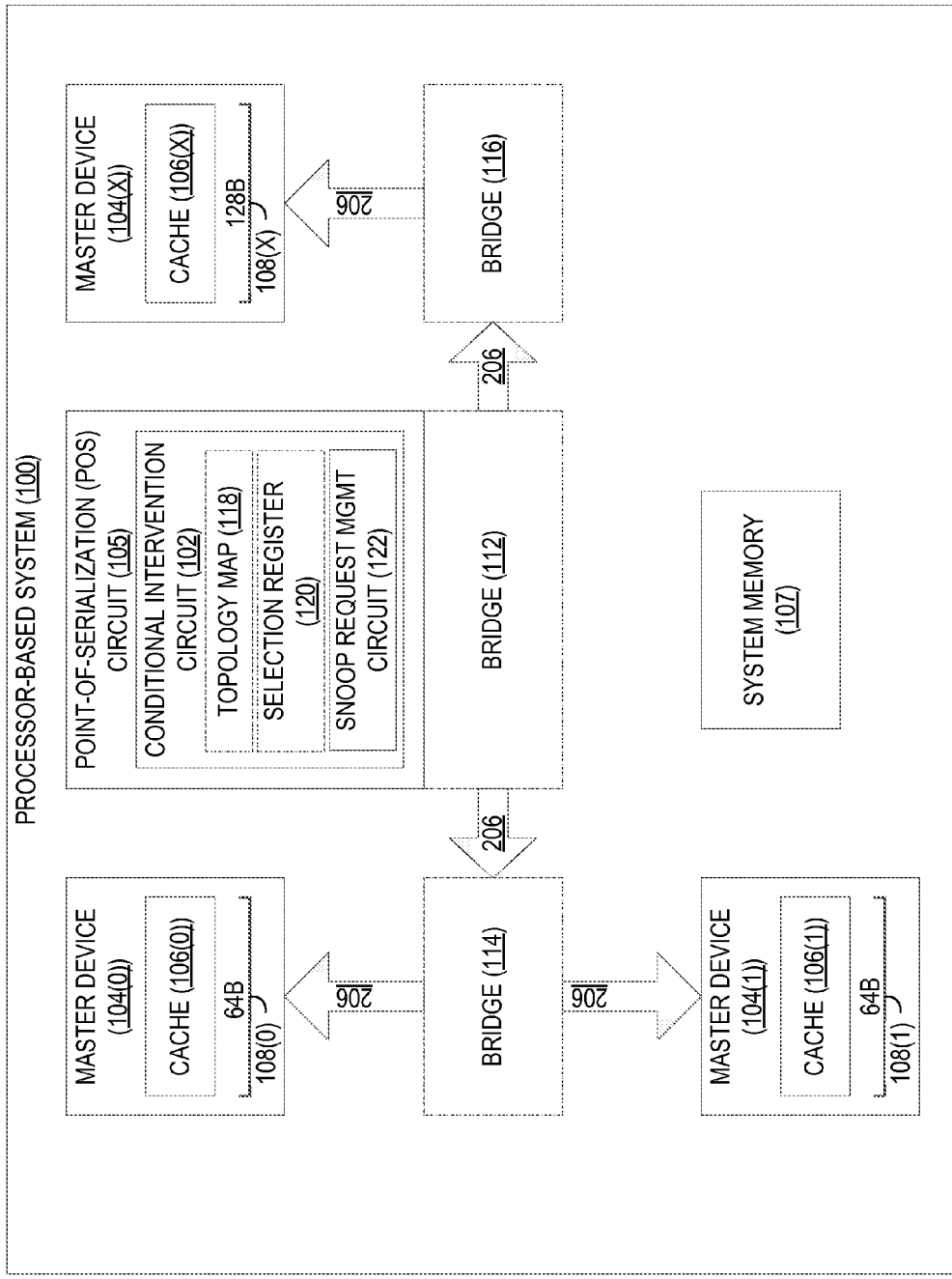
Figure 3D:
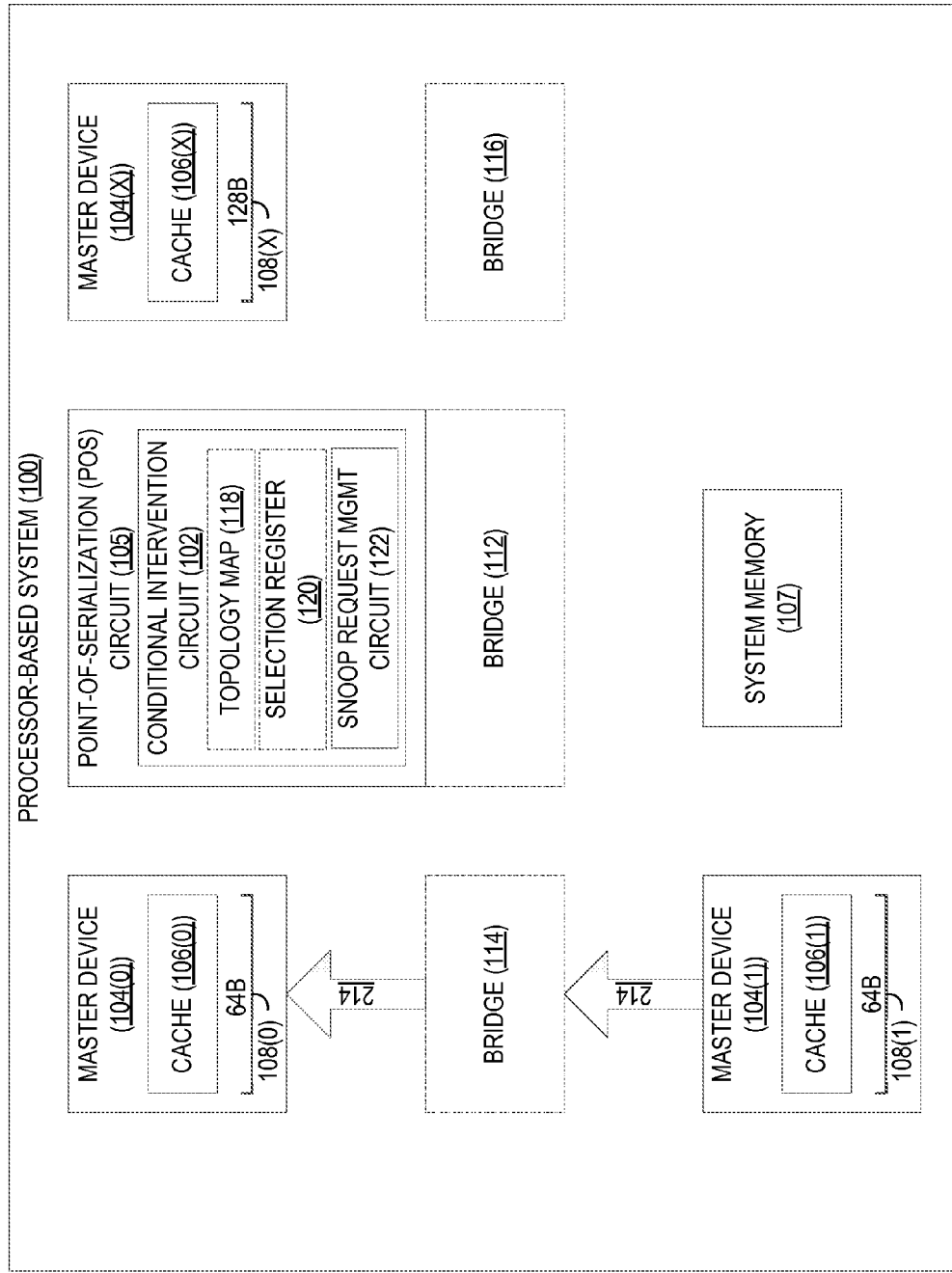

Referring now to FIG. 3C, the conditional intervention circuit 102 next cancels the intervention response 204(1) from the unselected snooping master device 104(X) by communicating the data 206 indicating the selection of the snooping master device 104(1) and the cancellation of the intervention response 204(1) from the unselected snooping master device 104(X) to each of the master devices 104(0)-104(X). Finally, as seen in FIG. 3D, the conditional intervention circuit 102 provides the intervention data 214 from the selected snooping master device 104(1) to the requesting master device 104(0). By selecting the snooping master device 104(1) having a shortest path to the requesting master device 104(0), the conditional intervention circuit 102 may reduce memory access latency and power consumption of the processor-based system 100.

As noted above, in some instances, one or more of the master devices 104(0)-104(X) (i.e., a "retry master device 104(0)-104(X)") may provide a retry response (not shown) rather than an intervention response 204 (e.g., if a snooped read request presents a conflict with another pending request currently being processed by the retry master device 104(0)-104(X)). To illustrate exemplary communications flows among the conditional intervention circuit 102 and the master devices 104(0)-104(X) of FIG. 1 for handling retry requests, FIGS. 4A-4D are provided. FIGS. 4A-4D show the processor-based system 100 including four (4) master devices 104(0), 104(1), 104(2), 104(X). The master devices 104(0) and 104(1) of FIGS. 4A-4D have cache line granule sizes 108(0) and 108(1), respectively, of 64 bytes ("64B"). The master devices 104(2) and 104(X) have cache line granule sizes 108(2) and 108(X), respectively, of 128 bytes ("128B"). The bus 110 of FIG. 1 is not shown in FIGS. 4A-4D for the sake of clarity.

Figure 4A:
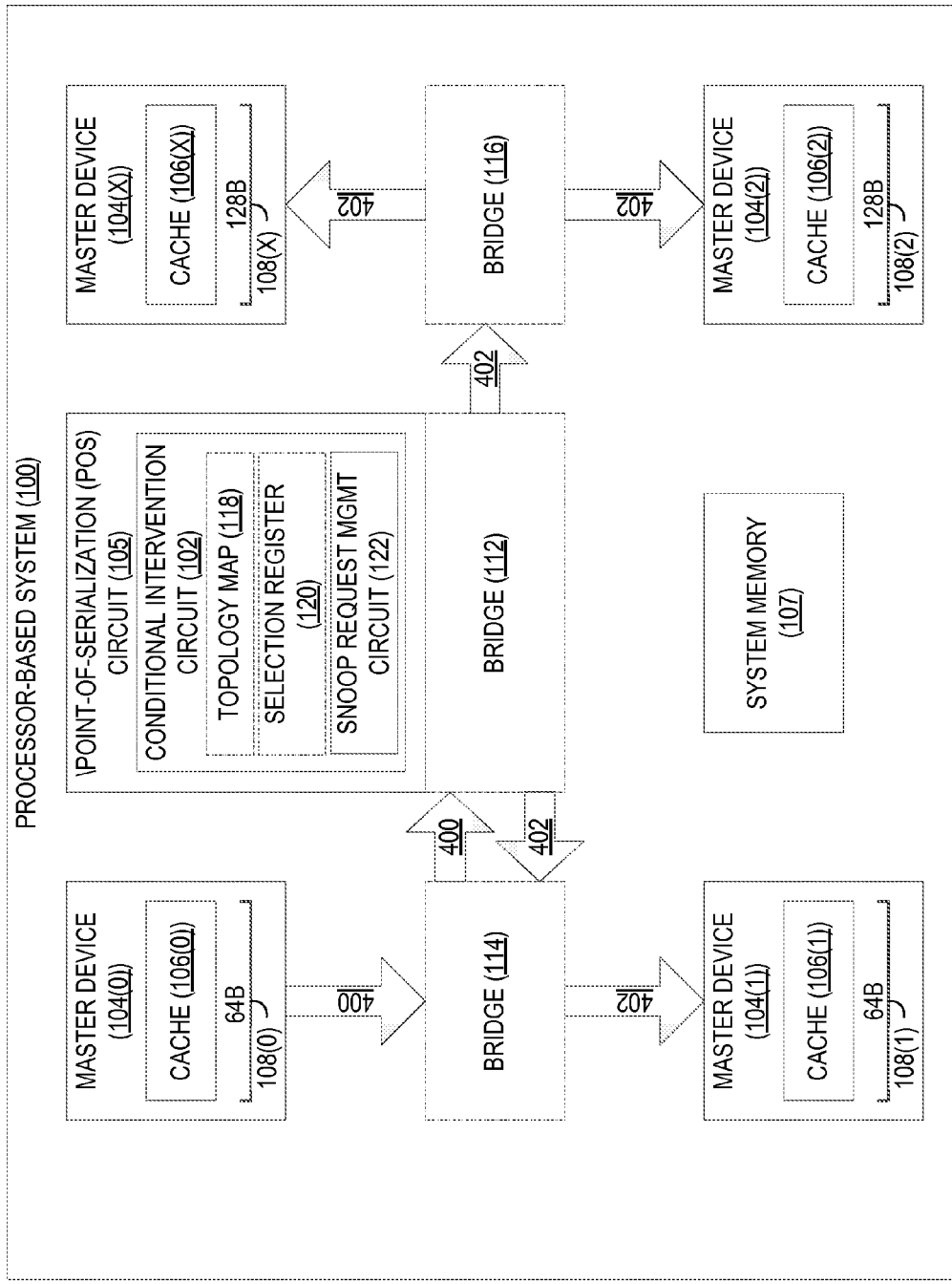
FIGS. 4A-4D are block diagrams illustrating exemplary communications flows among the conditional intervention circuit and master devices of FIG. 1 for handling a retry request received from a snooping master device.
Figure 4B:
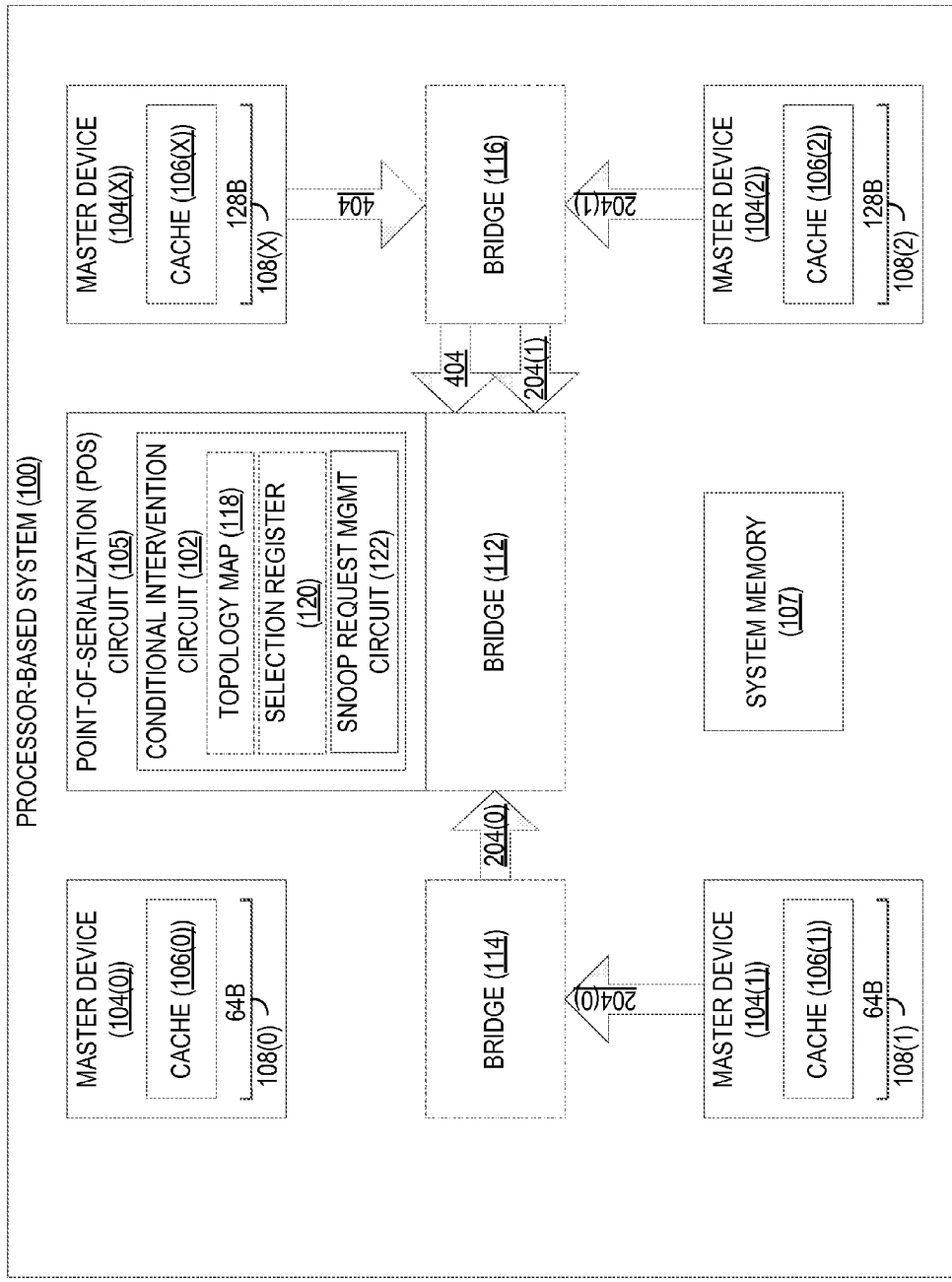

Referring to FIG. 4A, the requesting master device 104(0) sends a read request 400 to the conditional intervention circuit 102 via the bridge 114 and the bridge 112. The conditional intervention circuit 102 then sends a snoop response 402 to the snooping master devices 104(1), 104(2), and 104(X). As seen in FIG. 4B, the conditional intervention circuit 102 then receives intervention responses 204(0) and 204(1) from the snooping master devices 104(1) and 104(2), respectively. However, the conditional intervention circuit 102 also receives a retry response 404 from the master device 104(X) (i.e., the "retry master device 104(X)"). Because the retry response 404 from the retry master device 104(X) may inadvertently mask "dirty" data, the conditional intervention circuit 102 in some aspects may cancel each intervention response 204(0), 204(1) from each snooping master device 104(1), 104(2) having a cache line granule size 108(1), 108(2) smaller than the cache line granule size 108(X) of the retry master device 104(X). In the example of FIG. 4B, the snooping master device 104(1) has the cache line granule size 108(1) of 64 bytes, which is smaller than the 128-byte cache line granule size 108(X) of the retry master device 104(X). In contrast, the cache line granule size 108(2) of the snooping master device 104(2) is the same size as the cache line granule size 108(X) of the retry master device 104(X). Accordingly, the conditional intervention circuit 102 cancels the intervention response 204(0) of the snooping master device 104(1) while maintaining the intervention response 204(1) of the snooping master device 104(2). The conditional intervention circuit 102 then selects the snooping master device 104(2) as the only remaining snooping master device 104(2) providing an intervention response 204(1), to provide intervention data 214 to the requesting master device 104(0).

Figure 4C:
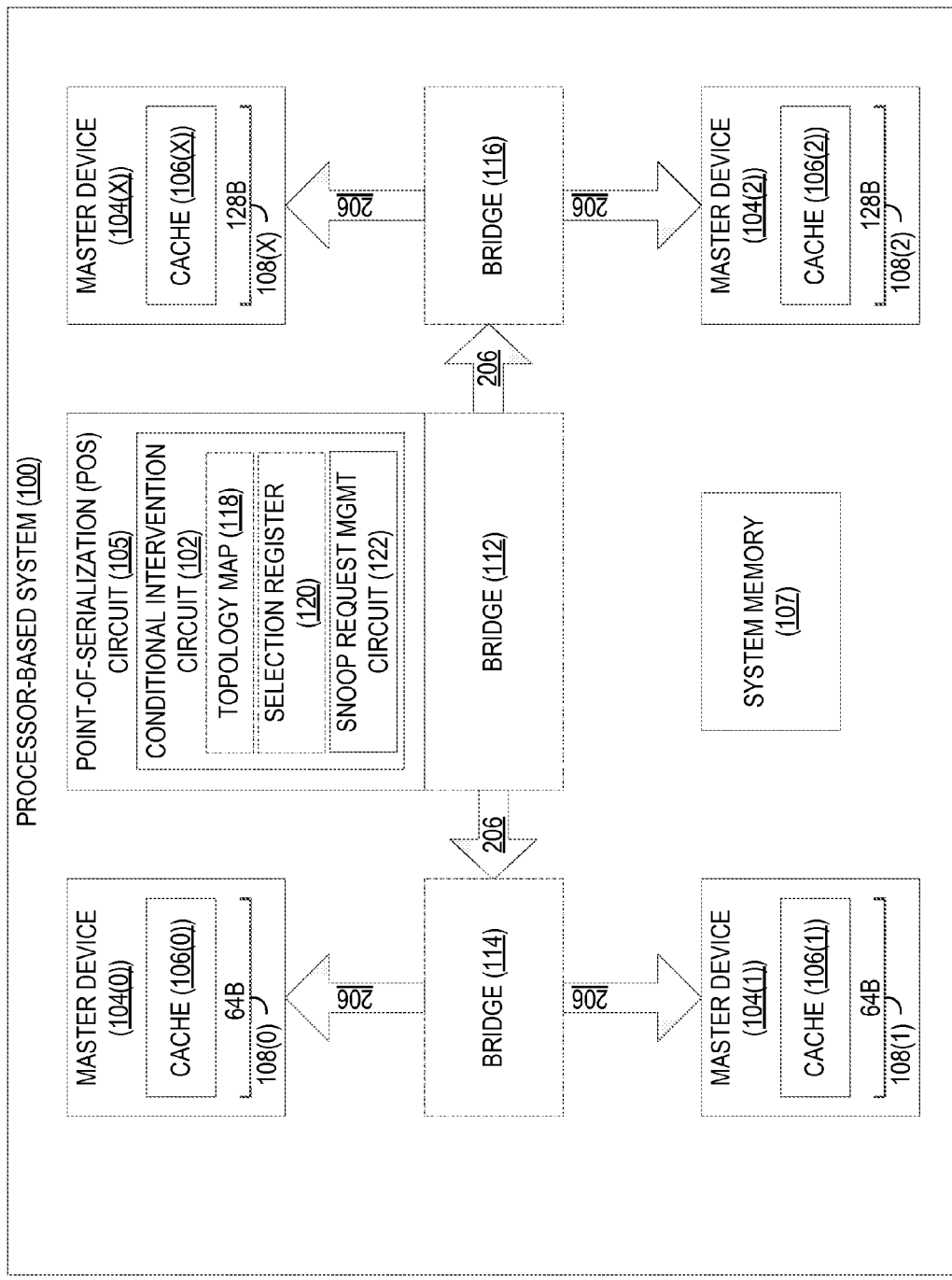
Figure 4D:
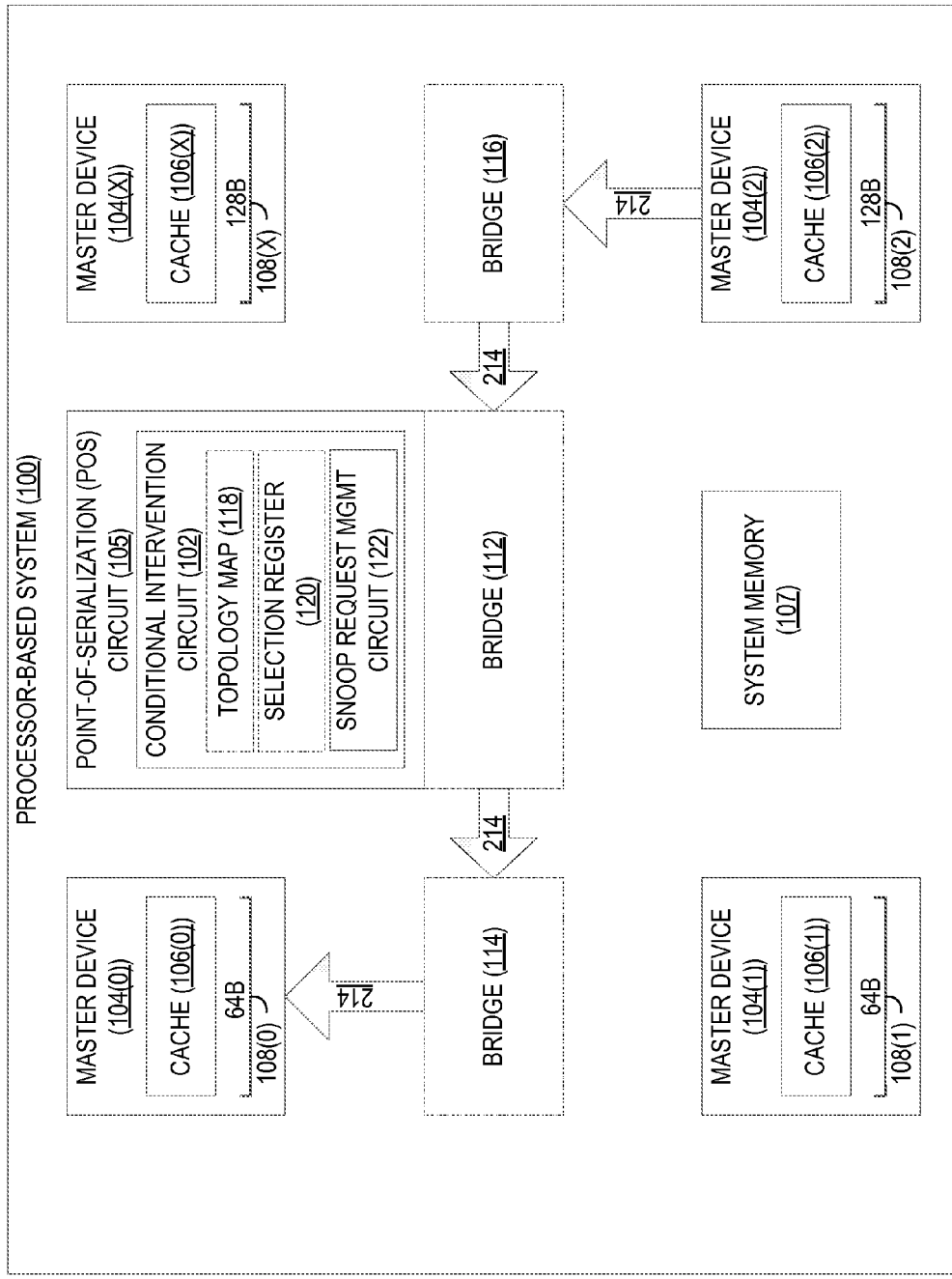

After selecting the snooping master device 104(2), the conditional intervention circuit 102 communicates data 206 indicating the selection of the snooping master device 104(2) and the cancellation of the intervention response 204(0) from the snooping master device 104(1) to the each of the master devices 104(0)-104(X), as shown in FIG. 4C. Finally, as seen in FIG. 4D, the conditional intervention circuit 102 provides intervention data 214 from the selected snooping master device 104(2) to the requesting master device 104(0).

Figure 5A:
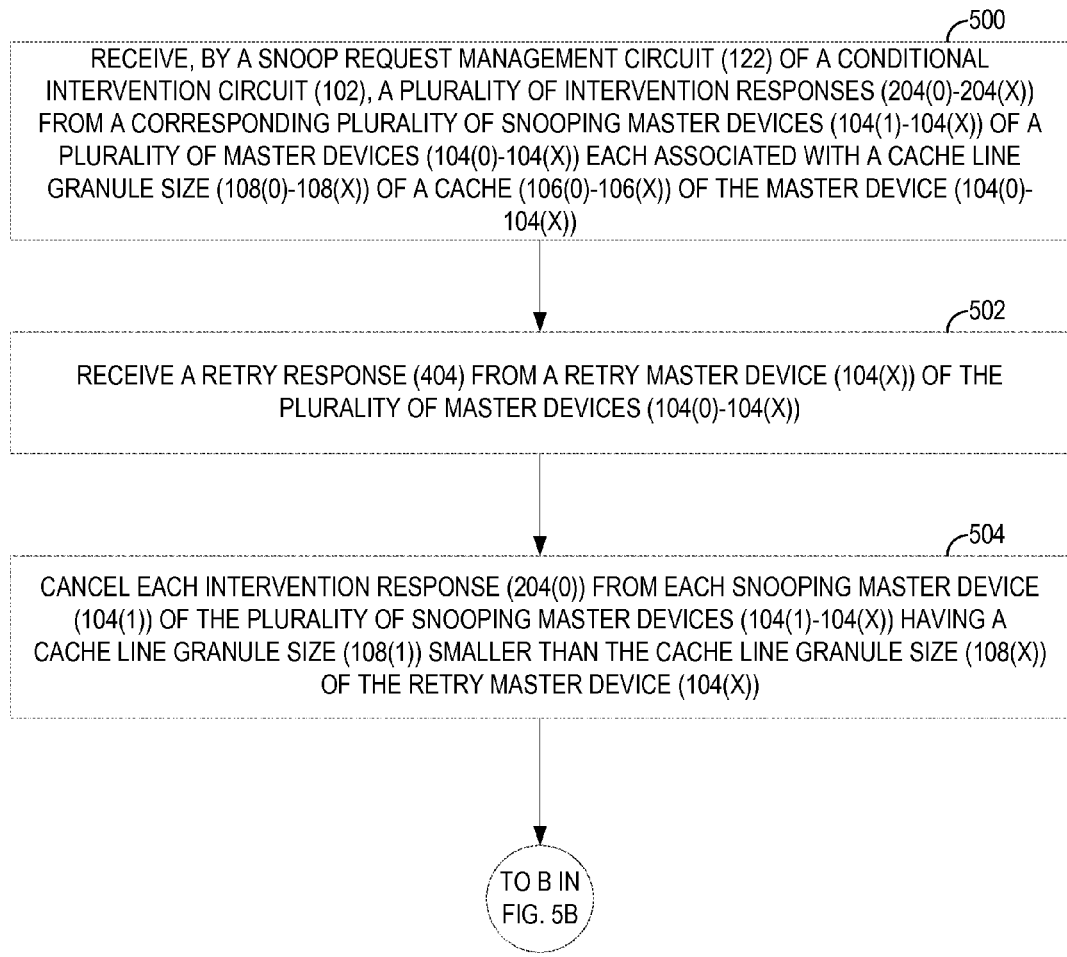
FIGS. 5A-5C are flowcharts illustrating an exemplary process for maintaining cache coherency using conditional intervention among multiple master devices.
Figure 5B:
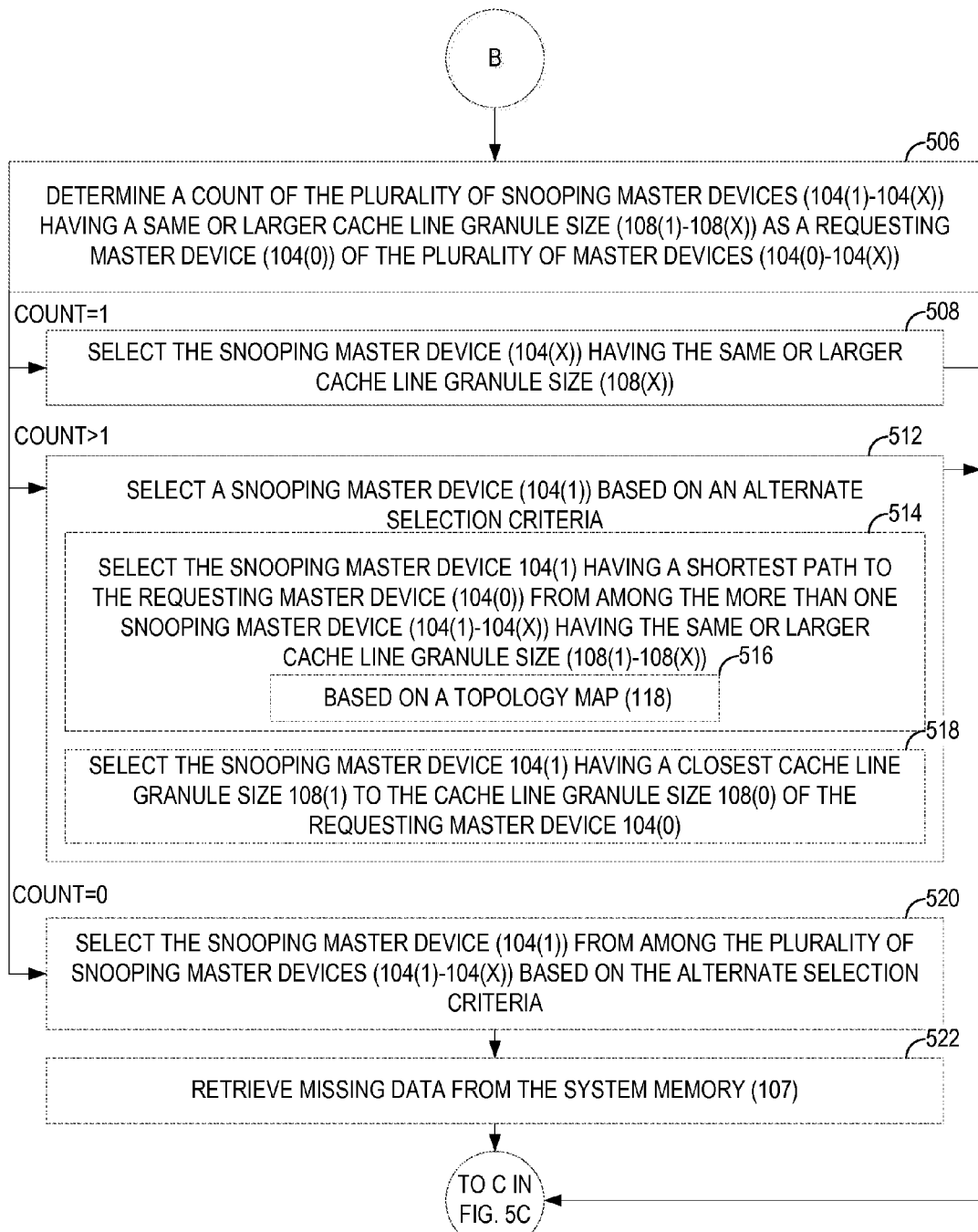
Figure 5C:
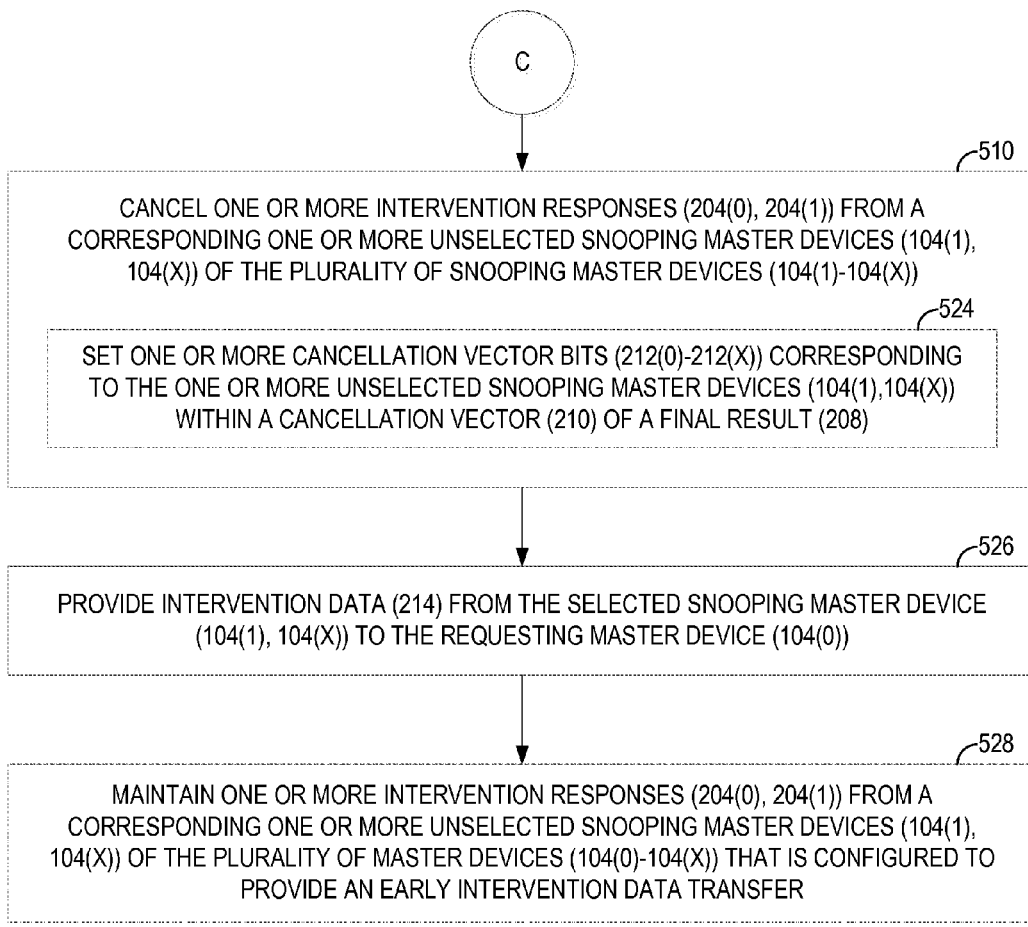

FIGS. 5A-5C are flowcharts illustrating an exemplary process for maintaining cache coherency using conditional intervention among multiple master devices. For the sake of clarity, elements of FIGS. 1, 2A-2D, 3A-3D, and 4A-4D are referenced in describing FIGS. 5A-5C. In FIG. 5A, operations begin with the snoop request management circuit 122 of the conditional intervention circuit 102 receiving a plurality of intervention responses 204(0)-204(X) from a corresponding plurality of snooping master devices 104(1)-104(X) of a plurality of master devices 104(0)-104(X), each associated with a cache line granule size 108(0)-108(X) of a cache 106(0)-106(X) of the master devices 104(0)-104(X) (block 500). In this regard, the snoop request management circuit 122 may be referred to herein as "a means for receiving a plurality of intervention responses from a corresponding plurality of snooping master devices of a plurality of master devices according to a snoop-based cache coherency protocol, each master device associated with a cache line granule size of a cache of the master device."

In some aspects, the conditional intervention circuit 102 may receive a retry response 404 from a retry master device 104(X) of the plurality of master devices 104(0)-104(X) (block 502). Accordingly, the conditional intervention circuit 102 may be referred to herein as "a means for receiving a retry response from a retry master device of the plurality of master devices." In response, the conditional intervention circuit 102 may cancel each intervention response 204(0) from each snooping master device 104(1) of the plurality of snooping master devices 104(1)-104(X) having a cache line granule size 108(1) smaller than the cache line granule size 108(X) of the retry master device 104(X) (block 504). The conditional intervention circuit 102 may thus be referred to herein as "a means for canceling each intervention response of the plurality of intervention responses from each snooping master device of the plurality of snooping master devices having a cache line granule size smaller than a cache line granule size of the retry master device." Processing then continues at block 506 of FIG. 5B.

Turning now to FIG. 5B, the conditional intervention circuit 102 next determines a count of the plurality of snooping master devices 104(1)-104(X) having a same or larger cache line granule size 108(1)-108(X) as a requesting master device 104(0) of the plurality of master devices 104(0)-104(X) (block 506). In this regard, the conditional intervention circuit 102 may be referred to herein as "a means for determining a count of the plurality of snooping master devices having a same or larger cache line granule size as a requesting master device of the plurality of master devices." If the conditional intervention circuit 102 determines at block 506 that one snooping master device 104(X) has the same or larger cache line granule size 108(X) as the requesting master device 104(0) (i.e., "COUNT=1"), the conditional intervention circuit 102 selects the snooping master device 104(X) having the same or larger cache line granule size 108(X) (block 508). Accordingly, the conditional intervention circuit 102 may be referred to herein as "a means for selecting, responsive to determining that one snooping master device has the same or larger cache line granule size, one snooping master device of the plurality of snooping master devices having the same or larger cache line granule size." Processing then resumes at block 510 of FIG. 5C.

However, if the conditional intervention circuit 102 determines at block 506 that more than one snooping master device 104(1)-104(X) has the same or larger cache line granule size 108(1)-108(X) as the requesting master device 104(0) (i.e., "COUNT>1"), the conditional intervention circuit 102 selects a snooping master device 104(1) based on the alternate selection criteria from among the more than one snooping master device 104(1)-104(X) having the same or larger cache line granule size 108(1)-108(X) (block 512). The conditional intervention circuit 102 may thus be referred to herein as "a means for selecting, responsive to determining that more than one snooping master device of the plurality of snooping master devices has the same or larger cache line granule size, a snooping master device based on an alternate selection criteria from among the more than one snooping master device of the plurality of snooping master devices having the same or larger cache line granule size." According to some aspects, operations of block 512 for selecting the snooping master device 104(1) may include selecting the snooping master device 104(1) having a shortest path to the requesting master device 104(0) from among the more than one snooping master device 104(1)-104(X) having the same or larger cache line granule size 108(1)-108(X) (block 514). Accordingly, the conditional intervention circuit 102 may be referred to herein as "a means for selecting the snooping master device having a shortest path to the requesting master device." In some aspects, operations of block 514 may be based on the topology map 118 (block 516). Some aspects may provide that operations of block 512 for selecting the snooping master device 104(1) may include selecting the snooping master device 104(1) having a closest cache line granule size 108(1) to the cache line granule size 108(0) of the requesting master device 104(0) (block 518). In this regard, the conditional intervention circuit 102 may be referred to herein as "a means for selecting the snooping master device having a closest cache line granule size to the cache line granule size of the requesting master device." Processing then resumes at block 510 of FIG. 5C.

Returning to block 506 of FIG. 5B, if the conditional intervention circuit 102 determines that none of the snooping master devices 104(1)-104(X) has the same or larger cache line granule size 108(1)-108(X) as the requesting master device 104(0) (i.e., "COUNT=0"), the conditional intervention circuit 102 selects a snooping master device 104(1) from among the plurality of snooping master devices 104(1)-104(X) based on the alternate selection criteria (block 520). The conditional intervention circuit 102 thus may be referred to herein as "a means for selecting the snooping master device from among the plurality of snooping master devices based on the alternate selection criteria, responsive to determining that no snooping master device of the plurality of snooping master devices has the same or larger cache line granule size." As the selected snooping master device 104(1) may not be able to provide all data requested by the requesting master device 104(0), the conditional intervention circuit 102 in some aspects may retrieve missing data from the system memory 107 (block 522). Accordingly, the conditional intervention circuit 102 may be referred to herein as "a means for retrieving missing data from a system memory." Processing then continues at block 510 of FIG. 5C.

In FIG. 5C, the conditional intervention circuit 102 next cancels one or more intervention responses 204(0), 204(1) from a corresponding one or more unselected snooping master devices 104(1), 104(X) of the plurality of snooping master devices 104(1)-104(X) (block 510). Accordingly, the conditional intervention circuit 102 may be referred to herein as "a means for canceling one or more intervention responses of the plurality of intervention responses from a corresponding one or more unselected snooping master devices of the plurality of snooping master devices." In some aspects, operations of block 510 for canceling the one or more intervention responses 204(0), 204(1) may comprise setting one or more cancellation vector bits 212(0)-212(X) corresponding to the one or more unselected snooping master devices 104(1), 104(X) within a cancellation vector 210 of a final result 208 (block 524). The conditional intervention circuit 102 may thus be referred to herein as "a means for setting one or more cancellation vector bits corresponding to the one or more unselected snooping master devices within a cancellation vector of a final result."

The conditional intervention circuit 102 then provides intervention data 214 from the selected snooping master device 104(1), 104(X) to the requesting master device 104(0) (block 526). In this regard, the conditional intervention circuit 102 may be referred to herein as "a means for providing intervention data from the selected snooping master device to the requesting master device." In some aspects, the conditional intervention circuit 102 may maintain the intervention response 204(0), 204(1) from the unselected snooping master devices 104(1), 104(X) that are configured to provide an early intervention data transfer (block 528). Accordingly, the conditional intervention circuit 102 may be referred to herein as "a means for maintaining one or more intervention responses from a corresponding one or more unselected snooping master devices of the plurality of snooping master devices that is configured to provide early intervention data transfer."

Maintaining cache coherency using conditional intervention among multiple master devices according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 6:
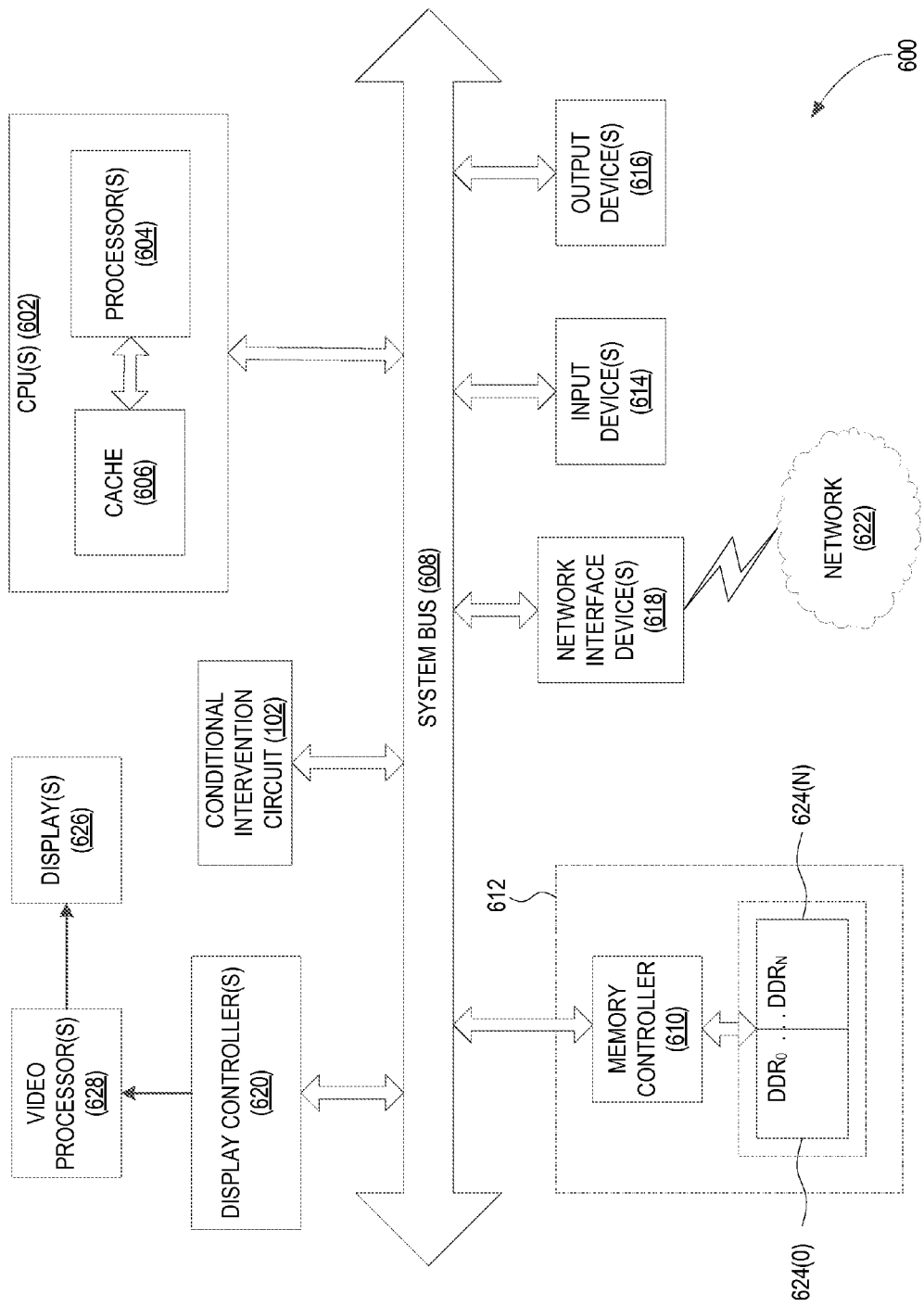
FIG. 6 is a block diagram of an exemplary processor-based system that can include the conditional intervention circuit of FIG. 1.

In this regard, FIG. 6 illustrates an example of a processor-based system 600 that can employ the conditional intervention circuit 102 illustrated in FIG. 1. In this example, the processor-based system 600 may correspond to the processor-based system 100 of FIG. 1. The processor-based system 600 includes one or more central processing units (CPUs) 602, each including one or more processors 604. The CPU(s) 602 may be a master device 104(0)-104(X). The CPU(s) 602 may have cache memory 606 coupled to the processor(s) 604 for rapid access to temporarily stored data. The CPU(s) 602 is coupled to a system bus 608 and can intercouple master and slave devices included in the processor-based system 600. As is well known, the CPU(s) 602 communicates with these other devices by exchanging address, control, and data information over the system bus 608. For example, the CPU(s) 602 can communicate bus transaction requests to a memory controller 610 as an example of a slave device.

Other master and slave devices can be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including but not limited to input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include one or more memory units 624(0-N).

The CPU(s) 602 may also be configured to access the display controller(s) 620 over the system bus 608 to control information sent to one or more displays 626. The display controller(s) 620 sends information to the display(s) 626 to be displayed via one or more video processors 628, which process the information to be displayed into a format suitable for the display(s) 626. The display(s) 626 can include any type of display, including but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A conditional intervention circuit for maintaining cache coherency using conditional intervention, the conditional intervention circuit comprising a snoop request management circuit and configured to:
    receive, using the snoop request management circuit, a plurality of intervention responses from a corresponding plurality of snooping master devices of a plurality of master devices according to one or more snoop-based cache coherency protocols, each master device of the plurality of master devices associated with a cache line granule size of a cache of the master device, wherein a first master device of the plurality of master devices is associated with a first cache line granule size and a second master device of the plurality of master devices is associated with a second cache line granule size that is different from the first cache line granule size;
    determine a count of the plurality of snooping master devices having a same or larger cache line granule size as a requesting master device of the plurality of master devices;
    responsive to the count of the plurality of snooping master devices having the same or larger cache line granule size as the requesting master device being equal to one (1), select the one snooping master device having the same or larger cache line granule size;
    responsive to the count of the plurality of snooping master devices having the same or larger cache line granule size as the requesting master device being greater than one (1), select a snooping master device based on an alternate selection criterion from among snooping master devices having the same or larger cache line granule size;
    cancel, using the snoop request management circuit, one or more intervention responses of the plurality of intervention responses from a corresponding one or more unselected snooping master devices of the plurality of snooping master devices; and
    provide, using the snoop request management circuit, intervention data from the selected snooping master device to the requesting master device.

2. The conditional intervention circuit of claim 1 comprising a selection register configured to indicate the alternate selection criteria, wherein the conditional intervention circuit is further configured to select the snooping master device based on the alternate selection criteria indicated by the selection register.

3. The conditional intervention circuit of claim 1, configured to select the snooping master device based on the alternate selection criteria by selecting the snooping master device having a shortest path to the requesting master device.

4. The conditional intervention circuit of claim 3, configured to select the snooping master device having the shortest path to the requesting master device based on a topology map.

5. The conditional intervention circuit of claim 1, configured to select the snooping master device based on the alternate selection criteria by selecting the snooping master device having a closest cache line granule size to the cache line granule size of the requesting master device.

6. The conditional intervention circuit of claim 1, further configured to, responsive to determining that no snooping master device of the plurality of snooping master devices has the same or larger cache line granule size:
    select the snooping master device from among the plurality of snooping master devices based on the alternate selection criteria; and
    retrieve missing data from a system memory.

7. The conditional intervention circuit of claim 1, wherein the snoop request management circuit is configured to cancel the one or more intervention responses from the corresponding one or more unselected snooping master devices of the plurality of snooping master devices by setting one or more cancellation vector bits corresponding to the one or more unselected snooping master devices within a cancellation vector of a final result.

8. The conditional intervention circuit of claim 1, further configured to maintain the one or more intervention responses from the corresponding one or more unselected snooping master devices of the plurality of snooping master devices that is configured to provide an early intervention data transfer.

9. The conditional intervention circuit of claim 1, wherein the snoop request management circuit is further configured to:
    receive a retry response from a retry master device of the plurality of master devices; and
    cancel each intervention response of the plurality of intervention responses from each snooping master device of the plurality of snooping master devices having a cache line granule size smaller than a cache line granule size of the retry master device.

10. The conditional intervention circuit of claim 1, wherein the one or more snoop-based cache coherency protocols comprises an Advanced Extensible Interface (AXI) Coherency Extensions (ACE) protocol.

11. The conditional intervention circuit of claim 1 integrated into an integrated circuit (IC).

12. The conditional intervention circuit of claim 1 integrated into a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

13. A conditional intervention circuit for maintaining cache coherency using conditional intervention, comprising:
a means for receiving a plurality of intervention responses from a corresponding plurality of snooping master devices of a plurality of master devices according to one or more snoop-based cache coherency protocols, each master device associated with a cache line granule size of a cache of the master device, wherein a first master device of the plurality of master devices is associated with a first cache line granule size and a second master device of the plurality of master devices is associated with a second cache line granule size that is different from the first cache line granule size;
a means for determining a count of the plurality of snooping master devices having a same or larger cache line granule size as a requesting master device of the plurality of master devices;
a means for selecting, responsive to the count of the plurality of snooping master devices having the same or larger cache line granule size as the requesting master device being equal to one (1), the one snooping master device of the plurality of snooping master devices having the same or larger cache line granule size;
a means for selecting, responsive to the count of the plurality of snooping master devices having the same or larger cache line granule size as the requesting master device being greater than one (1), a snooping master device based on an alternate selection criterion from among the snooping master devices of the plurality of snooping master devices having the same or larger cache line granule size;
a means for canceling one or more intervention responses of the plurality of intervention responses from a corresponding one or more unselected snooping master devices of the plurality of snooping master devices; and
a means for providing intervention data from the selected snooping master device to the requesting master device.

14. The conditional intervention circuit of claim 13 further comprising a means for indicating the alternate selection criteria, wherein the means for selecting the snooping master device based on the alternate selection criteria is based on the means for indicating the alternate selection criteria.

15. The conditional intervention circuit of claim 13, wherein the means for selecting the snooping master device based on the alternate selection criteria comprises a means for selecting the snooping master device having a shortest path to the requesting master device.

16. The conditional intervention circuit of claim 15, wherein the means for selecting the snooping master device having the shortest path to the requesting master device comprises a topology map.

17. The conditional intervention circuit of claim 13, wherein the means for selecting the snooping master device based on the alternate selection criteria comprises a means for selecting the snooping master device having a closest cache line granule size to the cache line granule size of the requesting master device.

18. The conditional intervention circuit of claim 13, further comprising:
a means for selecting the snooping master device from among the plurality of snooping master devices based on the alternate selection criteria, responsive to determining that no snooping master device of the plurality of snooping master devices has the same or larger cache line granule size; and
a means for retrieving missing data from a system memory.

19. The conditional intervention circuit of claim 13, wherein the means for canceling the one or more intervention responses from the corresponding one or more unselected snooping master devices of the plurality of snooping master devices comprises a means for setting one or more cancellation vector bits corresponding to the one or more unselected snooping master devices within a cancellation vector of a final result.

20. The conditional intervention circuit of claim 13, further comprising a means for maintaining the one or more intervention responses from the corresponding one or more unselected snooping master devices of the plurality of snooping master devices that is configured to provide an early intervention data transfer.

21. The conditional intervention circuit of claim 13, further comprising:
a means for receiving a retry response from a retry master device of the plurality of master devices; and
a means for canceling each intervention response of the plurality of intervention responses from each snooping master device of the plurality of snooping master devices having a cache line granule size smaller than a cache line granule size of the retry master device.

22. The conditional intervention circuit of claim 13, wherein the one or more snoop-based cache coherency protocols comprises an Advanced Extensible Interface (AXI) Coherency Extensions (ACE) protocol.

23. A method of maintaining cache coherency using conditional intervention, comprising:
receiving, by a conditional intervention circuit, a plurality of intervention responses from a corresponding plurality of snooping master devices of a plurality of master devices according to one or more snoop-based cache coherency protocols, each master device of the plurality of master devices associated with a cache line granule size of a cache, wherein a first master device of the plurality of master devices is associated with a first cache line granule size and a second master device of the plurality of master devices is associated with a second cache line granule size that is different from the first cache line granule size;
determining a count of the plurality of snooping master devices having a same or larger cache line granule size as a requesting master device of the plurality of master devices;
responsive to the count of the plurality of snooping master devices having the same or larger cache line granule size as the requesting master device being equal to one (1), selecting the one snooping master device having the same or larger cache line granule size;

responsive to the count of the plurality of snooping master devices having the same or larger cache line granule size as the requesting master device being greater than one (1), selecting a snooping master device based on an alternate selection criterion from among the snooping master devices having the same or larger cache line granule size;

canceling one or more intervention responses of the plurality of intervention responses from a corresponding one or more unselected snooping master devices of the plurality of snooping master devices; and providing intervention data from the selected snooping master device to the requesting master device.

24. The method of claim 23, wherein selecting the snooping master device based on the alternate selection criteria is indicated by a selection register.

25. The method of claim 23, wherein selecting the snooping master device based on the alternate selection criteria comprises selecting the snooping master device having a shortest path to the requesting master device.

26. The method of claim 25, wherein selecting the snooping master device having the shortest path to the requesting master device from among the more than one snooping master device having the same or larger cache line granule size is based on a topology map.

27. The method of claim 23, wherein selecting the snooping master device based on the alternate selection criteria comprises selecting the snooping master device having a closest cache line granule size to the cache line granule size of the requesting master device.

28. The method of claim 23, further comprising, responsive to determining that no snooping master device of the plurality of snooping master devices has the same or larger cache line granule size:

selecting the snooping master device from among the plurality of snooping master devices based on the alternate selection criteria; and retrieving missing data from a system memory.

29. The method of claim 23, wherein canceling the one or more intervention responses from the corresponding one or more unselected snooping master devices of the plurality of snooping master devices comprises setting one or more cancellation vector bits corresponding to the one or more unselected snooping master devices within a cancellation vector of a final result.

30. The method of claim 23, further comprising maintaining the one or more intervention responses from the corresponding one or more unselected snooping master devices of the plurality of snooping master devices that is configured to provide an early intervention data transfer.

31. The method of claim 23, further comprising:

receiving a retry response from a retry master device of the plurality of master devices; and canceling each intervention response of the plurality of snooping master devices from each snooping master device of the plurality of snooping master devices having a cache line granule size smaller than a cache line granule size of the retry master device.

32. The method of claim 23, wherein the one or more snoop-based cache coherency protocols comprises an Advanced Extensible Interface (AXI) Coherency Extensions (ACE) protocol.

* * * * *